United States Patent
Tien et al.

(10) Patent No.: US 8,863,064 B1
(45) Date of Patent: Oct. 14, 2014

(54) SRAM CELL LAYOUT STRUCTURE AND DEVICES THEREFROM

(71) Applicant: SuVolta, Inc., Los Gatos, CA (US)

(72) Inventors: George Tien, Cupertino, CA (US); David A. Kidd, San Jose, CA (US); Lawrence T. Clark, Phoenix, AZ (US)

(73) Assignee: SuVolta, Inc., Los Gatos, CA (US)

( * ) Notice: Subject to any disclaimer, the term of this patent is extended or adjusted under 35 U.S.C. 154(b) by 0 days.

(21) Appl. No.: 13/776,917

(22) Filed: Feb. 26, 2013

Related U.S. Application Data

(60) Provisional application No. 61/615,166, filed on Mar. 23, 2012.

(51) Int. Cl.
*G06F 17/50* (2006.01)

(52) U.S. Cl.
CPC .................................. *G06F 17/5072* (2013.01)
USPC .......................................... 716/119; 716/100

(58) Field of Classification Search
USPC ................................................. 716/100, 119
See application file for complete search history.

(56) References Cited

U.S. PATENT DOCUMENTS

| | | |
|---|---|---|
| 3,958,266 A | 5/1976 | Athanas |
| 4,000,504 A | 12/1976 | Berger |
| 4,021,835 A | 5/1977 | Etoh et al. |
| 4,242,691 A | 12/1980 | Kotani et al. |
| 4,276,095 A | 6/1981 | Beilstein, Jr. et al. |
| 4,315,781 A | 2/1982 | Henderson |
| 4,518,926 A | 5/1985 | Swanson |
| 4,559,091 A | 12/1985 | Allen et al. |
| 4,578,128 A | 3/1986 | Mundt et al. |

(Continued)

FOREIGN PATENT DOCUMENTS

| | | |
|---|---|---|
| EP | 0274278 | 7/1988 |
| EP | 0312237 | 4/1989 |

(Continued)

OTHER PUBLICATIONS

Banerjee, et al. "Compensating Non-Optical Effects using Electrically-Driven Optical Proximity Correction", Proc. of SPIE vol. 7275 72750E, 2009.

(Continued)

*Primary Examiner* — Stacy Whitmore
*Assistant Examiner* — Magid Dimyan
(74) *Attorney, Agent, or Firm* — Novak Druce Connolly Bove + Quigg LLP; Eduardo J. Quinones

(57) ABSTRACT

A method for modifying a design of an integrated circuit includes obtaining design layout data for the integrated circuit and selecting at least one SRAM cell in the integrated circuit to utilize enhanced body effect (EBE) transistors comprising a substantially undoped channel layer and a highly doped screening region beneath the channel layer. The method also includes extracting, from the design layout, NMOS active area patterns and PMOS active area patterns associated with the SRAM cell to define an EBE NMOS active area layout and a EBE PMOS active area layout. The method further includes adjusting the EBE NMOS active area layout to reduce a width of at least pull-down devices in the SRAM cell and altering a gate layer layout in the design layout data such that a length of pull-up devices in the at least one SRAM and a length of the pull-down devices are substantially equal.

6 Claims, 13 Drawing Sheets

(56) References Cited

U.S. PATENT DOCUMENTS

| | | | |
|---|---|---|---|
| 4,617,066 A | 10/1986 | Vasudev | |
| 4,662,061 A | 5/1987 | Malhi | |
| 4,761,384 A | 8/1988 | Neppl et al. | |
| 4,780,748 A | 10/1988 | Cunningham et al. | |
| 4,819,043 A | 4/1989 | Yazawa et al. | |
| 4,885,477 A | 12/1989 | Bird et al. | |
| 4,908,681 A | 3/1990 | Nishida et al. | |
| 4,945,254 A | 7/1990 | Robbins | |
| 4,956,311 A | 9/1990 | Liou et al. | |
| 5,034,337 A | 7/1991 | Mosher et al. | |
| 5,144,378 A | 9/1992 | Hikosaka | |
| 5,156,989 A | 10/1992 | Williams et al. | |
| 5,156,990 A | 10/1992 | Mitchell | |
| 5,166,765 A | 11/1992 | Lee et al. | |
| 5,208,473 A | 5/1993 | Komori et al. | |
| 5,294,821 A | 3/1994 | Iwamatsu | |
| 5,298,763 A | 3/1994 | Shen et al. | |
| 5,369,288 A | 11/1994 | Usuki | |
| 5,373,186 A | 12/1994 | Schubert et al. | |
| 5,384,476 A | 1/1995 | Nishizawa et al. | |
| 5,426,328 A | 6/1995 | Yilmaz et al. | |
| 5,444,008 A | 8/1995 | Han et al. | |
| 5,552,332 A | 9/1996 | Tseng et al. | |
| 5,559,368 A | 9/1996 | Hu et al. | |
| 5,608,253 A | 3/1997 | Liu et al. | |
| 5,622,880 A | 4/1997 | Burr et al. | |
| 5,624,863 A | 4/1997 | Helm et al. | |
| 5,625,568 A | 4/1997 | Edwards et al. | |
| 5,641,980 A | 6/1997 | Yamaguchi et al. | |
| 5,663,583 A | 9/1997 | Matloubian et al. | |
| 5,712,501 A | 1/1998 | Davies et al. | |
| 5,719,422 A | 2/1998 | Burr et al. | |
| 5,726,488 A | 3/1998 | Watanabe et al. | |
| 5,726,562 A | 3/1998 | Mizuno | |
| 5,731,626 A | 3/1998 | Eaglesham et al. | |
| 5,736,419 A | 4/1998 | Naem | |
| 5,753,555 A | 5/1998 | Hada | |
| 5,754,826 A | 5/1998 | Gamal et al. | |
| 5,756,365 A | 5/1998 | Kakumu | |
| 5,763,921 A | 6/1998 | Okumura et al. | |
| 5,780,899 A | 7/1998 | Hu et al. | |
| 5,847,419 A | 12/1998 | Imai et al. | |
| 5,856,003 A | 1/1999 | Chiu | |
| 5,861,334 A | 1/1999 | Rho | |
| 5,877,049 A | 3/1999 | Liu et al. | |
| 5,885,876 A | 3/1999 | Dennen | |
| 5,889,315 A | 3/1999 | Farrenkopf et al. | |
| 5,895,954 A | 4/1999 | Yasumura et al. | |
| 5,899,714 A | 5/1999 | Farrenkopf et al. | |
| 5,918,129 A | 6/1999 | Fulford, Jr. et al. | |
| 5,923,067 A | 7/1999 | Voldman | |
| 5,923,987 A | 7/1999 | Burr | |
| 5,936,868 A | 8/1999 | Hall | |
| 5,946,214 A | 8/1999 | Heavlin et al. | |
| 5,985,705 A | 11/1999 | Seliskar | |
| 5,989,963 A | 11/1999 | Luning et al. | |
| 6,001,695 A | 12/1999 | Wu | |
| 6,020,227 A | 2/2000 | Bulucea | |
| 6,043,139 A | 3/2000 | Eaglesham et al. | |
| 6,060,345 A | 5/2000 | Hause et al. | |
| 6,060,364 A | 5/2000 | Maszara et al. | |
| 6,066,533 A | 5/2000 | Yu | |
| 6,072,217 A | 6/2000 | Burr | |
| 6,087,210 A | 7/2000 | Sohn | |
| 6,087,691 A | 7/2000 | Hamamoto | |
| 6,088,518 A | 7/2000 | Hsu | |
| 6,091,286 A | 7/2000 | Blauschild | |
| 6,096,611 A | 8/2000 | Wu | |
| 6,103,562 A | 8/2000 | Son et al. | |
| 6,121,153 A | 9/2000 | Kikkawa | |
| 6,147,383 A | 11/2000 | Kuroda | |
| 6,153,920 A | 11/2000 | Gossmann et al. | |
| 6,157,073 A | 12/2000 | Lehongres | |
| 6,175,582 B1 | 1/2001 | Naito et al. | |
| 6,184,112 B1 | 2/2001 | Maszara et al. | |
| 6,190,979 B1 | 2/2001 | Radens et al. | |
| 6,194,259 B1 | 2/2001 | Nayak et al. | |
| 6,198,157 B1 | 3/2001 | Ishida et al. | |
| 6,218,892 B1 | 4/2001 | Soumyanath et al. | |
| 6,218,895 B1 | 4/2001 | De et al. | |
| 6,221,724 B1 | 4/2001 | Yu et al. | |
| 6,229,188 B1 | 5/2001 | Aoki et al. | |
| 6,232,164 B1 | 5/2001 | Tsai et al. | |
| 6,235,597 B1 | 5/2001 | Miles | |
| 6,245,618 B1 | 6/2001 | An et al. | |
| 6,268,640 B1 | 7/2001 | Park et al. | |
| 6,271,070 B2 | 8/2001 | Kotani et al. | |
| 6,271,551 B1 | 8/2001 | Schmitz et al. | |
| 6,288,429 B1 | 9/2001 | Iwata et al. | |
| 6,297,132 B1 | 10/2001 | Zhang et al. | |
| 6,300,177 B1 | 10/2001 | Sundaresan et al. | |
| 6,313,489 B1 | 11/2001 | Letavic et al. | |
| 6,319,799 B1 | 11/2001 | Ouyang et al. | |
| 6,320,222 B1 | 11/2001 | Forbes et al. | |
| 6,323,525 B1 | 11/2001 | Noguchi et al. | |
| 6,326,666 B1 | 12/2001 | Bernstein et al. | |
| 6,335,233 B1 | 1/2002 | Cho et al. | |
| 6,358,806 B1 | 3/2002 | Puchner | |
| 6,380,019 B1 | 4/2002 | Yu et al. | |
| 6,391,752 B1 | 5/2002 | Colinge et al. | |
| 6,426,260 B1 | 7/2002 | Hshieh | |
| 6,426,279 B1 | 7/2002 | Huster et al. | |
| 6,432,754 B1 | 8/2002 | Assaderaghi et al. | |
| 6,437,419 B1 * | 8/2002 | Bhalla et al. | 257/582 |
| 6,444,550 B1 | 9/2002 | Hao et al. | |
| 6,444,551 B1 | 9/2002 | Ku et al. | |
| 6,449,749 B1 | 9/2002 | Stine | |
| 6,461,920 B1 | 10/2002 | Shirahata | |
| 6,461,928 B2 | 10/2002 | Rodder | |
| 6,472,278 B1 | 10/2002 | Marshall et al. | |
| 6,482,714 B1 | 11/2002 | Hieda et al. | |
| 6,489,224 B1 | 12/2002 | Burr | |
| 6,492,232 B1 | 12/2002 | Tang et al. | |
| 6,500,739 B1 | 12/2002 | Wang et al. | |
| 6,503,801 B1 | 1/2003 | Rouse et al. | |
| 6,503,805 B2 | 1/2003 | Wang et al. | |
| 6,506,640 B1 | 1/2003 | Ishida et al. | |
| 6,518,623 B1 | 2/2003 | Oda et al. | |
| 6,521,470 B1 | 2/2003 | Lin et al. | |
| 6,534,373 B1 | 3/2003 | Yu | |
| 6,541,328 B2 | 4/2003 | Whang et al. | |
| 6,541,829 B2 | 4/2003 | Nishinohara et al. | |
| 6,548,842 B1 | 4/2003 | Bulucea et al. | |
| 6,551,885 B1 | 4/2003 | Yu | |
| 6,552,377 B1 | 4/2003 | Yu | |
| 6,573,129 B2 | 6/2003 | Hoke et al. | |
| 6,576,535 B2 | 6/2003 | Drobny et al. | |
| 6,600,200 B1 | 7/2003 | Lustig et al. | |
| 6,620,671 B1 | 9/2003 | Wang et al. | |
| 6,624,488 B1 | 9/2003 | Kim | |
| 6,627,473 B1 | 9/2003 | Oikawa et al. | |
| 6,630,710 B1 | 10/2003 | Augusto | |
| 6,660,605 B1 | 12/2003 | Liu | |
| 6,662,350 B2 | 12/2003 | Fried et al. | |
| 6,667,200 B2 | 12/2003 | Sohn et al. | |
| 6,670,260 B1 | 12/2003 | Yu et al. | |
| 6,693,333 B1 | 2/2004 | Yu | |
| 6,730,568 B2 | 5/2004 | Sohn | |
| 6,737,724 B2 | 5/2004 | Hieda et al. | |
| 6,743,291 B2 | 6/2004 | Ang et al. | |
| 6,743,684 B2 | 6/2004 | Liu | |
| 6,751,519 B1 | 6/2004 | Satya et al. | |
| 6,753,230 B2 | 6/2004 | Sohn et al. | |
| 6,760,900 B2 | 7/2004 | Rategh et al. | |
| 6,770,944 B2 | 8/2004 | Nishinohara et al. | |
| 6,787,424 B1 | 9/2004 | Yu | |
| 6,797,553 B2 | 9/2004 | Adkisson et al. | |
| 6,797,602 B1 | 9/2004 | Kluth et al. | |
| 6,797,994 B1 | 9/2004 | Hoke et al. | |
| 6,808,004 B2 | 10/2004 | Kamm et al. | |
| 6,808,994 B1 | 10/2004 | Wang | |
| 6,813,750 B2 | 11/2004 | Usami et al. | |
| 6,821,825 B2 | 11/2004 | Todd et al. | |
| 6,821,852 B2 | 11/2004 | Rhodes | |

(56) References Cited

U.S. PATENT DOCUMENTS

| | | |
|---|---|---|
| 6,822,297 B2 | 11/2004 | Nandakumar et al. |
| 6,831,292 B2 | 12/2004 | Currie et al. |
| 6,835,639 B2 | 12/2004 | Rotondaro et al. |
| 6,852,602 B2 | 2/2005 | Kanzawa et al. |
| 6,852,603 B2 | 2/2005 | Chakravarthi et al. |
| 6,881,641 B2 | 4/2005 | Wieczorek et al. |
| 6,881,987 B2 | 4/2005 | Sohn |
| 6,891,439 B2 | 5/2005 | Jaehne et al. |
| 6,893,947 B2 | 5/2005 | Martinez et al. |
| 6,900,519 B2 | 5/2005 | Cantell et al. |
| 6,901,564 B2 | 5/2005 | Stine et al. |
| 6,916,698 B2 | 7/2005 | Mocuta et al. |
| 6,917,237 B1 | 7/2005 | Tschanz et al. |
| 6,927,463 B2 | 8/2005 | Iwata et al. |
| 6,928,128 B1 | 8/2005 | Sidiropoulos |
| 6,930,007 B2 | 8/2005 | Bu et al. |
| 6,930,360 B2 | 8/2005 | Yamauchi et al. |
| 6,957,163 B2 | 10/2005 | Ando |
| 6,963,090 B2 | 11/2005 | Passlack et al. |
| 6,995,397 B2 | 2/2006 | Yamashita et al. |
| 7,002,214 B1 | 2/2006 | Boyd et al. |
| 7,008,836 B2 | 3/2006 | Algotsson et al. |
| 7,013,359 B1 | 3/2006 | Li |
| 7,015,546 B2 | 3/2006 | Herr et al. |
| 7,015,741 B2 | 3/2006 | Tschanz et al. |
| 7,022,559 B2 | 4/2006 | Barnak et al. |
| 7,036,098 B2 | 4/2006 | Eleyan et al. |
| 7,038,258 B2 | 5/2006 | Liu et al. |
| 7,039,881 B2 | 5/2006 | Regan |
| 7,045,456 B2 | 5/2006 | Murto et al. |
| 7,057,216 B2 | 6/2006 | Ouyang et al. |
| 7,061,058 B2 | 6/2006 | Chakravarthi et al. |
| 7,064,039 B2 | 6/2006 | Liu |
| 7,064,399 B2 | 6/2006 | Babcock et al. |
| 7,071,103 B2 | 7/2006 | Chan et al. |
| 7,078,325 B2 | 7/2006 | Curello et al. |
| 7,078,776 B2 | 7/2006 | Nishinohara et al. |
| 7,089,513 B2 | 8/2006 | Bard et al. |
| 7,089,515 B2 | 8/2006 | Hanafi et al. |
| 7,091,093 B1 | 8/2006 | Noda et al. |
| 7,105,399 B1 | 9/2006 | Dakshina-Murthy et al. |
| 7,109,099 B2 | 9/2006 | Tan et al. |
| 7,119,381 B2 | 10/2006 | Passlack |
| 7,122,411 B2 | 10/2006 | Mouli |
| 7,127,687 B1 | 10/2006 | Signore |
| 7,132,323 B2 | 11/2006 | Haensch et al. |
| 7,169,675 B2 | 1/2007 | Tan et al. |
| 7,170,120 B2 | 1/2007 | Datta et al. |
| 7,176,137 B2 | 2/2007 | Perng et al. |
| 7,186,598 B2 | 3/2007 | Yamauchi et al. |
| 7,189,627 B2 | 3/2007 | Wu et al. |
| 7,199,430 B2 | 4/2007 | Babcock et al. |
| 7,202,517 B2 | 4/2007 | Dixit et al. |
| 7,208,354 B2 | 4/2007 | Bauer |
| 7,211,871 B2 | 5/2007 | Cho |
| 7,221,021 B2 | 5/2007 | Wu et al. |
| 7,223,646 B2 | 5/2007 | Miyashita et al. |
| 7,226,833 B2 | 6/2007 | White et al. |
| 7,226,843 B2 | 6/2007 | Weber et al. |
| 7,230,680 B2 | 6/2007 | Fujisawa et al. |
| 7,235,822 B2 | 6/2007 | Li |
| 7,256,639 B1 | 8/2007 | Koniaris et al. |
| 7,259,428 B2 | 8/2007 | Inaba |
| 7,260,562 B2 | 8/2007 | Czajkowski et al. |
| 7,294,877 B2 | 11/2007 | Rueckes et al. |
| 7,297,994 B2 | 11/2007 | Wieczorek et al. |
| 7,301,208 B2 | 11/2007 | Handa et al. |
| 7,304,350 B2 | 12/2007 | Misaki |
| 7,307,471 B2 | 12/2007 | Gammie et al. |
| 7,312,500 B2 | 12/2007 | Miyashita et al. |
| 7,323,754 B2 | 1/2008 | Ema et al. |
| 7,332,439 B2 | 2/2008 | Lindert et al. |
| 7,348,629 B2 | 3/2008 | Chu et al. |
| 7,354,833 B2 | 4/2008 | Liaw |
| 7,380,225 B2 | 5/2008 | Joshi et al. |
| 7,398,497 B2 | 7/2008 | Sato et al. |
| 7,402,207 B1 | 7/2008 | Besser et al. |
| 7,402,872 B2 | 7/2008 | Murthy et al. |
| 7,416,605 B2 | 8/2008 | Zollner et al. |
| 7,427,788 B2 | 9/2008 | Li et al. |
| 7,442,971 B2 | 10/2008 | Wirbeleit et al. |
| 7,449,733 B2 | 11/2008 | Inaba et al. |
| 7,462,908 B2 | 12/2008 | Bol et al. |
| 7,469,164 B2 | 12/2008 | Du-Nour |
| 7,470,593 B2 | 12/2008 | Rouh et al. |
| 7,485,536 B2 | 2/2009 | Jin et al. |
| 7,487,474 B2 | 2/2009 | Ciplickas et al. |
| 7,491,988 B2 | 2/2009 | Tolchinsky et al. |
| 7,494,861 B2 | 2/2009 | Chu et al. |
| 7,496,862 B2 | 2/2009 | Chang et al. |
| 7,496,867 B2 | 2/2009 | Turner et al. |
| 7,498,637 B2 | 3/2009 | Yamaoka et al. |
| 7,501,324 B2 | 3/2009 | Babcock et al. |
| 7,503,020 B2 | 3/2009 | Allen et al. |
| 7,507,999 B2 | 3/2009 | Kusumoto et al. |
| 7,514,766 B2 | 4/2009 | Yoshida |
| 7,521,323 B2 | 4/2009 | Surdeanu et al. |
| 7,531,393 B2 | 5/2009 | Doyle et al. |
| 7,531,836 B2 | 5/2009 | Liu et al. |
| 7,538,364 B2 | 5/2009 | Twynam |
| 7,538,412 B2 | 5/2009 | Schulze et al. |
| 7,562,233 B1 | 7/2009 | Sheng et al. |
| 7,564,105 B2 | 7/2009 | Chi et al. |
| 7,566,600 B2 | 7/2009 | Mouli |
| 7,569,456 B2 | 8/2009 | Ko et al. |
| 7,586,322 B1 | 9/2009 | Xu et al. |
| 7,592,241 B2 | 9/2009 | Takao |
| 7,595,243 B1 | 9/2009 | Bulucea et al. |
| 7,598,142 B2 | 10/2009 | Ranade et al. |
| 7,605,041 B2 | 10/2009 | Ema et al. |
| 7,605,060 B2 | 10/2009 | Meunier-Beillard et al. |
| 7,605,429 B2 | 10/2009 | Bernstein et al. |
| 7,608,496 B2 | 10/2009 | Chu |
| 7,615,802 B2 | 11/2009 | Elpelt et al. |
| 7,622,341 B2 | 11/2009 | Chudzik et al. |
| 7,638,380 B2 | 12/2009 | Pearce |
| 7,642,140 B2 | 1/2010 | Bae et al. |
| 7,644,377 B1 | 1/2010 | Saxe et al. |
| 7,645,665 B2 | 1/2010 | Kubo et al. |
| 7,651,920 B2 | 1/2010 | Siprak |
| 7,655,523 B2 | 2/2010 | Babcock et al. |
| 7,673,273 B2 | 3/2010 | Madurawe et al. |
| 7,675,126 B2 | 3/2010 | Cho |
| 7,675,317 B2 | 3/2010 | Perisetty |
| 7,678,638 B2 | 3/2010 | Chu et al. |
| 7,681,628 B2 | 3/2010 | Joshi et al. |
| 7,682,887 B2 | 3/2010 | Dokumaci et al. |
| 7,683,442 B1 | 3/2010 | Burr et al. |
| 7,696,000 B2 | 4/2010 | Liu et al. |
| 7,704,822 B2 | 4/2010 | Jeong |
| 7,704,844 B2 | 4/2010 | Zhu et al. |
| 7,709,828 B2 | 5/2010 | Braithwaite et al. |
| 7,723,750 B2 | 5/2010 | Zhu et al. |
| 7,737,472 B2 | 6/2010 | Kondo et al. |
| 7,741,138 B2 | 6/2010 | Cho |
| 7,741,200 B2 | 6/2010 | Cho et al. |
| 7,745,270 B2 | 6/2010 | Shah et al. |
| 7,750,374 B2 | 7/2010 | Capasso et al. |
| 7,750,381 B2 | 7/2010 | Hokazono et al. |
| 7,750,405 B2 | 7/2010 | Nowak |
| 7,750,682 B2 | 7/2010 | Bernstein et al. |
| 7,755,144 B2 | 7/2010 | Li et al. |
| 7,755,146 B2 | 7/2010 | Helm et al. |
| 7,759,206 B2 | 7/2010 | Luo et al. |
| 7,759,714 B2 | 7/2010 | Itoh et al. |
| 7,761,820 B2 | 7/2010 | Berger et al. |
| 7,795,677 B2 | 9/2010 | Bangsaruntip et al. |
| 7,808,045 B2 | 10/2010 | Kawahara et al. |
| 7,808,410 B2 | 10/2010 | Kim et al. |
| 7,811,873 B2 | 10/2010 | Mochizuki |
| 7,811,881 B2 | 10/2010 | Cheng et al. |
| 7,818,702 B2 | 10/2010 | Mandelman et al. |
| 7,821,066 B2 | 10/2010 | Lebby et al. |
| 7,829,402 B2 | 11/2010 | Matocha et al. |

(56) References Cited

U.S. PATENT DOCUMENTS

| | | | |
|---|---|---|---|
| 7,831,873 B1 | 11/2010 | Trimberger et al. | |
| 7,846,822 B2 | 12/2010 | Seebauer et al. | |
| 7,855,118 B2 | 12/2010 | Hoentschel et al. | |
| 7,859,013 B2 | 12/2010 | Chen et al. | |
| 7,863,163 B2 | 1/2011 | Bauer | |
| 7,867,835 B2 | 1/2011 | Lee et al. | |
| 7,883,977 B2 | 2/2011 | Babcock et al. | |
| 7,888,205 B2 | 2/2011 | Herner et al. | |
| 7,888,747 B2 | 2/2011 | Hokazono | |
| 7,895,546 B2 | 2/2011 | Lahner et al. | |
| 7,897,495 B2 | 3/2011 | Ye et al. | |
| 7,906,413 B2 | 3/2011 | Cardone et al. | |
| 7,906,813 B2 | 3/2011 | Kato | |
| 7,910,419 B2 | 3/2011 | Fenouillet-Beranger et al. | |
| 7,919,791 B2 | 4/2011 | Flynn et al. | |
| 7,926,018 B2 | 4/2011 | Moroz et al. | |
| 7,935,984 B2 | 5/2011 | Nakano | |
| 7,941,776 B2 | 5/2011 | Majumder et al. | |
| 7,945,800 B2 | 5/2011 | Gomm et al. | |
| 7,948,008 B2 | 5/2011 | Liu et al. | |
| 7,952,147 B2 | 5/2011 | Ueno et al. | |
| 7,960,232 B2 | 6/2011 | King et al. | |
| 7,960,238 B2 | 6/2011 | Kohli et al. | |
| 7,968,400 B2 | 6/2011 | Cai | |
| 7,968,411 B2 | 6/2011 | Williford | |
| 7,968,440 B2 | 6/2011 | Seebauer | |
| 7,968,459 B2 | 6/2011 | Bedell et al. | |
| 7,989,900 B2 | 8/2011 | Haensch et al. | |
| 7,994,573 B2 | 8/2011 | Pan | |
| 8,004,024 B2 | 8/2011 | Furukawa et al. | |
| 8,012,827 B2 | 9/2011 | Yu et al. | |
| 8,029,620 B2 | 10/2011 | Kim et al. | |
| 8,039,332 B2 | 10/2011 | Bernard et al. | |
| 8,046,598 B2 | 10/2011 | Lee | |
| 8,048,791 B2 | 11/2011 | Hargrove et al. | |
| 8,048,810 B2 | 11/2011 | Tsai et al. | |
| 8,051,340 B2 | 11/2011 | Cranford, Jr. et al. | |
| 8,053,340 B2 | 11/2011 | Colombeau et al. | |
| 8,063,466 B2 | 11/2011 | Kurita | |
| 8,067,279 B2 | 11/2011 | Sadra et al. | |
| 8,067,280 B2 | 11/2011 | Wang et al. | |
| 8,067,302 B2 | 11/2011 | Li | |
| 8,076,719 B2 | 12/2011 | Zeng et al. | |
| 8,097,529 B2 | 1/2012 | Krull et al. | |
| 8,103,983 B2 | 1/2012 | Agarwal et al. | |
| 8,105,891 B2 | 1/2012 | Yeh et al. | |
| 8,106,424 B2 | 1/2012 | Schruefer | |
| 8,106,481 B2 | 1/2012 | Rao | |
| 8,110,487 B2 | 2/2012 | Griebenow et al. | |
| 8,114,761 B2 | 2/2012 | Mandrekar et al. | |
| 8,119,482 B2 | 2/2012 | Bhalla et al. | |
| 8,120,069 B2 | 2/2012 | Hynecek | |
| 8,129,246 B2 | 3/2012 | Babcock et al. | |
| 8,129,797 B2 | 3/2012 | Chen et al. | |
| 8,134,159 B2 | 3/2012 | Hokazono | |
| 8,143,120 B2 | 3/2012 | Kerr et al. | |
| 8,143,124 B2 | 3/2012 | Challa et al. | |
| 8,143,678 B2 | 3/2012 | Kim et al. | |
| 8,148,774 B2 | 4/2012 | Mori et al. | |
| 8,163,619 B2 | 4/2012 | Yang et al. | |
| 8,169,002 B2 | 5/2012 | Chang et al. | |
| 8,170,857 B2 | 5/2012 | Joshi et al. | |
| 8,173,499 B2 | 5/2012 | Chung et al. | |
| 8,173,502 B2 | 5/2012 | Yan et al. | |
| 8,176,461 B1 | 5/2012 | Trimberger | |
| 8,178,430 B2 | 5/2012 | Kim et al. | |
| 8,179,530 B2 | 5/2012 | Levy et al. | |
| 8,183,096 B2 | 5/2012 | Wirbeleit | |
| 8,183,107 B2 | 5/2012 | Mathur et al. | |
| 8,185,865 B2 | 5/2012 | Gupta et al. | |
| 8,187,959 B2 | 5/2012 | Pawlak et al. | |
| 8,188,542 B2 | 5/2012 | Yoo et al. | |
| 8,196,545 B2 | 6/2012 | Kurosawa | |
| 8,201,122 B2 | 6/2012 | Dewey, III et al. | |
| 8,214,190 B2 | 7/2012 | Joshi et al. | |
| 8,217,423 B2 | 7/2012 | Liu et al. | |
| 8,225,255 B2 | 7/2012 | Ouyang et al. | |
| 8,227,307 B2 | 7/2012 | Chen et al. | |
| 8,236,661 B2 | 8/2012 | Dennard et al. | |
| 8,239,803 B2 | 8/2012 | Kobayashi | |
| 8,247,300 B2 | 8/2012 | Babcock et al. | |
| 8,255,843 B2 | 8/2012 | Chen et al. | |
| 8,258,026 B2 | 9/2012 | Bulucea | |
| 8,266,567 B2 | 9/2012 | El Yahyaoui et al. | |
| 8,286,180 B2 | 10/2012 | Foo | |
| 8,288,798 B2 | 10/2012 | Passlack | |
| 8,299,562 B2 | 10/2012 | Li et al. | |
| 8,324,059 B2 | 12/2012 | Guo et al. | |
| 2001/0014495 A1 | 8/2001 | Yu | |
| 2002/0042184 A1 | 4/2002 | Nandakumar et al. | |
| 2002/0175383 A1* | 11/2002 | Kocon et al. | 257/376 |
| 2002/0195653 A1* | 12/2002 | Huang | 257/329 |
| 2003/0006415 A1 | 1/2003 | Yokogawa et al. | |
| 2003/0047763 A1 | 3/2003 | Hieda et al. | |
| 2003/0122203 A1 | 7/2003 | Nishinohara et al. | |
| 2003/0173626 A1 | 9/2003 | Burr | |
| 2003/0183856 A1 | 10/2003 | Wieczorek et al. | |
| 2003/0215992 A1 | 11/2003 | Sohn et al. | |
| 2004/0075118 A1 | 4/2004 | Heinemann et al. | |
| 2004/0075143 A1 | 4/2004 | Bae et al. | |
| 2004/0084731 A1 | 5/2004 | Matsuda et al. | |
| 2004/0087090 A1 | 5/2004 | Grudowski et al. | |
| 2004/0126947 A1 | 7/2004 | Sohn | |
| 2004/0175893 A1 | 9/2004 | Vatus et al. | |
| 2004/0180488 A1 | 9/2004 | Lee | |
| 2005/0106824 A1 | 5/2005 | Alberto et al. | |
| 2005/0116282 A1 | 6/2005 | Pattanayak et al. | |
| 2005/0250289 A1 | 11/2005 | Babcock et al. | |
| 2005/0280075 A1 | 12/2005 | Ema et al. | |
| 2006/0022270 A1 | 2/2006 | Boyd et al. | |
| 2006/0049464 A1 | 3/2006 | Rao | |
| 2006/0068555 A1 | 3/2006 | Zhu et al. | |
| 2006/0068586 A1 | 3/2006 | Pain | |
| 2006/0071278 A1 | 4/2006 | Takao | |
| 2006/0154428 A1 | 7/2006 | Dokumaci | |
| 2006/0197158 A1 | 9/2006 | Babcock et al. | |
| 2006/0203581 A1 | 9/2006 | Joshi et al. | |
| 2006/0220114 A1 | 10/2006 | Miyashita et al. | |
| 2006/0223248 A1 | 10/2006 | Venugopal et al. | |
| 2007/0040222 A1 | 2/2007 | Van Camp et al. | |
| 2007/0117326 A1 | 5/2007 | Tan et al. | |
| 2007/0158790 A1 | 7/2007 | Rao | |
| 2007/0212861 A1 | 9/2007 | Chidambarrao et al. | |
| 2007/0238253 A1 | 10/2007 | Tucker | |
| 2008/0067589 A1 | 3/2008 | Ito et al. | |
| 2008/0108208 A1 | 5/2008 | Arevalo et al. | |
| 2008/0169493 A1 | 7/2008 | Lee et al. | |
| 2008/0169516 A1 | 7/2008 | Chung | |
| 2008/0197439 A1 | 8/2008 | Goerlach et al. | |
| 2008/0227250 A1 | 9/2008 | Ranade et al. | |
| 2008/0237661 A1 | 10/2008 | Ranade et al. | |
| 2008/0258198 A1 | 10/2008 | Bojarczuk et al. | |
| 2008/0272409 A1 | 11/2008 | Sonkusale et al. | |
| 2009/0057746 A1 | 3/2009 | Sugll et al. | |
| 2009/0108350 A1 | 4/2009 | Cai et al. | |
| 2009/0134468 A1 | 5/2009 | Tsuchiya et al. | |
| 2009/0224319 A1 | 9/2009 | Kohli | |
| 2009/0302388 A1 | 12/2009 | Cai et al. | |
| 2009/0309140 A1 | 12/2009 | Khamankar et al. | |
| 2009/0311837 A1 | 12/2009 | Kapoor | |
| 2009/0321849 A1 | 12/2009 | Miyamura et al. | |
| 2010/0012988 A1 | 1/2010 | Yang et al. | |
| 2010/0038724 A1 | 2/2010 | Anderson et al. | |
| 2010/0100856 A1 | 4/2010 | Mittal | |
| 2010/0148153 A1 | 6/2010 | Hudait et al. | |
| 2010/0149854 A1 | 6/2010 | Vora | |
| 2010/0187641 A1 | 7/2010 | Zhu et al. | |
| 2010/0207182 A1 | 8/2010 | Paschal | |
| 2010/0270600 A1 | 10/2010 | Inukai et al. | |
| 2011/0059588 A1 | 3/2011 | Kang | |
| 2011/0073961 A1 | 3/2011 | Dennard et al. | |
| 2011/0074498 A1 | 3/2011 | Thompson et al. | |
| 2011/0079860 A1 | 4/2011 | Verhulst | |
| 2011/0079861 A1 | 4/2011 | Shifren et al. | |

(56) References Cited

U.S. PATENT DOCUMENTS

| | | |
|---|---|---|
| 2011/0095811 A1 | 4/2011 | Chi et al. |
| 2011/0147828 A1 | 6/2011 | Murthy et al. |
| 2011/0169082 A1 | 7/2011 | Zhu et al. |
| 2011/0175170 A1 | 7/2011 | Wang et al. |
| 2011/0180880 A1 | 7/2011 | Chudzik et al. |
| 2011/0193164 A1 | 8/2011 | Zhu |
| 2011/0212590 A1 | 9/2011 | Wu et al. |
| 2011/0230039 A1 | 9/2011 | Mowry et al. |
| 2011/0242921 A1 | 10/2011 | Tran et al. |
| 2011/0248352 A1 | 10/2011 | Shifren |
| 2011/0294278 A1 | 12/2011 | Eguchi et al. |
| 2011/0309447 A1 | 12/2011 | Arghavani et al. |
| 2012/0021594 A1 | 1/2012 | Gurtej et al. |
| 2012/0034745 A1 | 2/2012 | Colombeau et al. |
| 2012/0056275 A1 | 3/2012 | Cai et al. |
| 2012/0065920 A1 | 3/2012 | Nagumo et al. |
| 2012/0108050 A1 | 5/2012 | Chen et al. |
| 2012/0132998 A1 | 5/2012 | Kwon et al. |
| 2012/0138953 A1 | 6/2012 | Cai et al. |
| 2012/0146155 A1 | 6/2012 | Hoentschel et al. |
| 2012/0167025 A1 | 6/2012 | Gillespie et al. |
| 2012/0187491 A1 | 7/2012 | Zhu et al. |
| 2012/0190177 A1 | 7/2012 | Kim et al. |
| 2012/0223363 A1 | 9/2012 | Kronholz et al. |
| 2012/0327725 A1* | 12/2012 | Clark et al. ............ 365/189.011 |

FOREIGN PATENT DOCUMENTS

| | | |
|---|---|---|
| EP | 0531621 | 3/1993 |
| EP | 0683515 | 11/1995 |
| EP | 0889502 | 1/1999 |
| EP | 1450394 | 8/2004 |
| JP | 59193066 | 11/1984 |
| JP | 4186774 | 7/1992 |
| JP | 8153873 | 6/1996 |
| JP | 8288508 | 11/1996 |
| JP | 2004087671 | 3/2004 |
| KR | 794094 | 1/2008 |
| WO | WO2011/062788 | 5/2011 |

OTHER PUBLICATIONS

Cheng, et al. "Extremely Thin SOI (ETSOI) CMOS with Record Low Variability for Low Power System-on-Chip Applications", Electron Devices Meeting (IEDM), Dec. 2009.

Cheng, et al. "Fully Depleted Extremely Thin SOI Technology Fabricated by a Novel Integration Scheme Feturing Implant-Free, Zero-Silicon-Loss, and Faceted Raised Source/Drain", Symposium on VLSI Technology Digest of Technical Papers, pp. 212-213, 2009.

Drennan, et al. "Implications of Proximity Effects for Analog Design", Custom Integrated Circuits Conference, pp. 169-176, Sep. 2006.

Hook, et al. "Lateral Ion Implant Straggle and Mask Proximity Effect", IEEE Transactions on Electron Devices, vol. 50, No. 9, pp. 1946-1951, Sep. 2003.

Hori, et al., "A 0.1 µm CMOS with a Step Channel Profile Formed by Ultra High Vacuum CVD and In-Situ Doped Ions", Proceedsing of the International Electron Devices Meeting, New York, IEEE, US, pp. 909-911, Dec. 5, 1993.

Matsiiuasiii, et al. "High-Performance Double-Layer Epitaxial-Channel PMOSFET Compatible with a Single Gate CMOSFET", Symposium on VLSI Technology Digest of Technical Papers, pp. 36-37, 1996.

Shao, et al., "Boron Diffusion in Silicon: The Anomalies and Control by Point Defect Engineering", Materials Science and Engineering R: Reports, vol. 42, No. 3-4, pp. 65-114, Nov. 1-12, 2003.

Sheu, et al. "Modeling the Well-Edge Proximity Effect in Highly Scaled MOSFETs", IEEE Transactions on Electron Devices, vol. 53, No. 11, pp. 2792-2798, Nov. 2006.

Abiko, H et al., "A Channel Engineering Combined with Channel Epitaxy Optimization and TED Suppression for 0.15µm n-n Gate CMOS Technology", 1995 Symposium on VLSI Technology Digest of Technical Papers, pp. 23-24, 1995.

Chau, Ret al., "A 50nm Depleted-Substrate CMOS Transistor (DST)", Electron Device Meeting 2001, IEDM Technical Digest, IEEE International, pp. 29.1.1-29.1.4, 2001.

Ducroquet, F et al. "Fully Depleted Silicon-on-Insulator nMOSFETs with Tensile Strained High Carbon Content $Si_{1-y}C_y$ Channel", ECS 210th Meeting, Abstract 1033, 2006.

Ernst, T et al., "Nanoscaled MOSFET Transistors on Strained Si, SiGe, Ge Layers: Some Integration and Electrical Properties Features", ECS Trans. 2006, vol. 3, Issue 7, pp. 947-961, 2006.

Goesele, U et al., Diffusion Engineering by Carbon in Silicon, Mat. Res. Soc. Symp. vol. 610, 2000.

Hokazono, A et al., "Steep Channel & Halo Profiles Utilizing Boron-Diffusion-Barrier Layers (Si:C) for 32 nm Node and Beyond", 2008 Symposium on VLSI Technology Digest of Technical Papers, pp. 112-113, 2008.

Hokazono, A et al., "Steep Channel Profiles in n/pMOS Controlled by Boron-Doped Si:C Layers for Continual Bulk-CMOS Scaling", IEDM09-676 Symposium, pp. 29.1.1-29.1.4, 2009.

Holland, OW and Thomas, DK "A Method to Improve Activation of Implanted Dopants in SiC", Oak Ridge National Laboratory, Oak Ridge, TN, 2001.

Kotaki, H., et al., "Novel Bulk Dynamic Threshold Voltage MOSFET (B-DTMOS) with Advanced Isolation (SITOS) and Gate to Shallow-Well Contact (SSS-C) Processes for Ultra Low Power Dual Gate CMOS", IEDM 96, pp. 459-462, 1996.

Lavéant, P. "Incorporation, Diffusion and Agglomeration of Carbon in Silicon", Solid State Phenomena, vols. 82-84, pp. 189-194, 2002.

Noda, K et al., "A 0.1-µm Delta-Doped MOSFET Fabricated with Post-Low-Energy Implanting Selective Epitaxy" IEEE Transactions on Electron Devices, vol. 45, No. 4, pp. 809-814, Apr. 1998.

Ohguro, T et al., "An 0.18-µm CMOS for Mixed Digital and Analog Aplications with Zero-Volt-Vth Epitaxial-Channel MOSFET's", IEEE Transactions on Electron Devices, vol. 46, No. 7, pp. 1378-1383, Jul. 1999.

Pinacho, R et al., "Carbon in Silicon: Modeling of Diffusion and Clustering Mechanisms", Journal of Applied Physics, vol. 92, No. 3, pp. 1582-1588, Aug. 2002.

Robertson, LS et al., "The Effect of Impurities on Diffusion and Activation of Ion Implanted Boron in Silicon", Mat. Res. Soc. Symp. vol. 610, 2000.

Scholz, R et al., "Carbon-Induced Undersaturation of Silicon Self-Interstitials", Appl. Phys. Lett. 72(2), pp. 200-202, Jan. 1998.

Scholz, RF et al., "The Contribution of Vacancies to Carbon Out-Diffusion in Silicon", Appl. Phys. Lett., vol. 74, No. 3, pp. 392-394, Jan. 1999.

Stolk, PA et al., "Physical Mechanisms of Transient Enhanced Dopant Diffusion in Ion-Implanted Silicon", J. Appl. Phys. 81(9), pp. 6031-6050, May 1997.

Thompson, S et al., "MOS Scaling: Transistor Challenges for the 21st Century", Intel Technology Journal Q3' 1998, pp. 1-19, 1998.

Wann, C. et al., "Channel Profile Optimization and Device Design for Low-Power High-Performance Dynamic-Threshold MOSFET", IEDM 96, pp. 113-116, 1996.

Werner, P et al., "Carbon Diffusion in Silicon", Applied Physics Letters, vol. 73, No. 17, pp. 2465-2467, Oct. 1998.

Yan, Ran-Hong et al., "Scaling the Si MOSFET: From Bulk to SOI to Bulk", IEEE Transactions on Electron Devices, vol. 39, No. 7, Jul. 1992.

Komaragiri, R. et al., "Depletion-Free Poly Gate Electrode Architecture for Sub 100 Nanometer CMOS Devices with High-K Gate Dielectrics", IEEE IEDM Tech Dig., San Francisco CA, 833-836, Dec. 13-15, 2004.

Samsudin, K et al., "Integrating Intrinsic Parameter Fluctuation Description into BSIMSOI to Forecast sub-15nm UTB SOI based 6T SRAM Operation", Solid-State Electronics (50), pp. 86-93, 2006.

Wong, H et al., "Nanoscale CMOS", Proceedings of the IEEE, Vo. 87, No. 4, pp. 537-570, Apr. 1999.

* cited by examiner

100

200

500

550

600

650

700

750

800

850

890

SRAM CELL LAYOUT STRUCTURE AND DEVICES THEREFROM

CROSS-REFERENCE TO RELATED APPLICATIONS

This application claims priority to U.S. Provisional Application No. 61/615,166, entitled "Improved SRAM Cell Layout Structure and Related Methods", filed Mar. 23, 2012, the contents of which are herein incorporated by reference in their entirety.

FIELD OF THE INVENTION

The present invention relates to SRAM cell design, and more specifically to a method for fabricating integrated circuits including an improved SRAM cell layout structure and devices therefrom.

BACKGROUND

There are several interrelated design parameters that must be considered during SRAM cell design. These include, for example, static noise margin ("hereinafter" SNM), write margin, bit line speed, and data retention voltage. SNM is defined as the minimum DC noise voltage necessary to flip the state of the SRAM cell. An SRAM cell can have different SNM during read and write operations, referred to as read SNM and write SNM, respectively. Read SNM is also an indicator of cell stability and is sometimes simply referred to as cell stability. A higher read SNM indicates that it is more difficult to invert the state of the cell during a read operation. Write margin is defined as the minimum bit line voltage necessary to invert the state of an SRAM cell. A higher write margin indicates that it is easier to invert the state of the cell during a write operation. Read speed is defined as the bit line slew rate in response to a high word line voltage, typically the time from the rising edge assertion of word line until some differential between the high and falling bit line is obtained. Data retention voltage is defined as the minimum power supply voltage required to retain a logic state of either "0" or "1" data in the SRAM cell in standby mode.

As process technology has scaled, it has become increasingly difficult to control the variation of transistor parameters because of a variety of sources of systemic mismatch. These sources of systemic mismatch can also include geometric sources of mismatch that arise from variation in alignment and additional lithographic effects such as corner rounding. For example, the jogs or notches in the active silicon region, used to achieve a desired ratio between the strengths of the pull-down to pass-gate transistors (represented by the width to length ratio of each of these transistors) for cell stability during a read access, can be subject to significant corner rounding. Similarly, the jogs or notches in the gate structures, used to achieve a desired pull down transistor size, can also be subject to significant corner rounding.

Threshold voltage variations become a limiting factor in transistor design as process technology is optically scaled downward while voltage cannot be similarly scaled. Threshold voltage variations between neighboring MOSFETs can have significant impact on the SNM, cell stability, write margin, read speed, and data retention voltage of the SRAM cell. Threshold voltage variations between pass-gate and pull-down transistors of the SRAM cell can degrade cell stability. During a read, the read current discharging the bit line flows through the series connection of the pass-gate and pull-down NMOS transistors. The voltage divider formed by these transistors raises the low voltage in the cell, thereby contributing to the degradation of cell stability. Variations in the threshold voltage of the pass-gate or pull-down transistor can result in a large variation in the voltage divider ratio of the pass-gate transistors to pull down transistors, increasing the likelihood of inverting the SRAM cell during a read operation, i.e., upsetting the stored state. Other SRAM cell design parameters such as write margin, bit line speed (as measured by slew rate) or read current, and data retention voltage can also be affected by threshold voltage variations.

DETAILED DESCRIPTION

Figure 1:
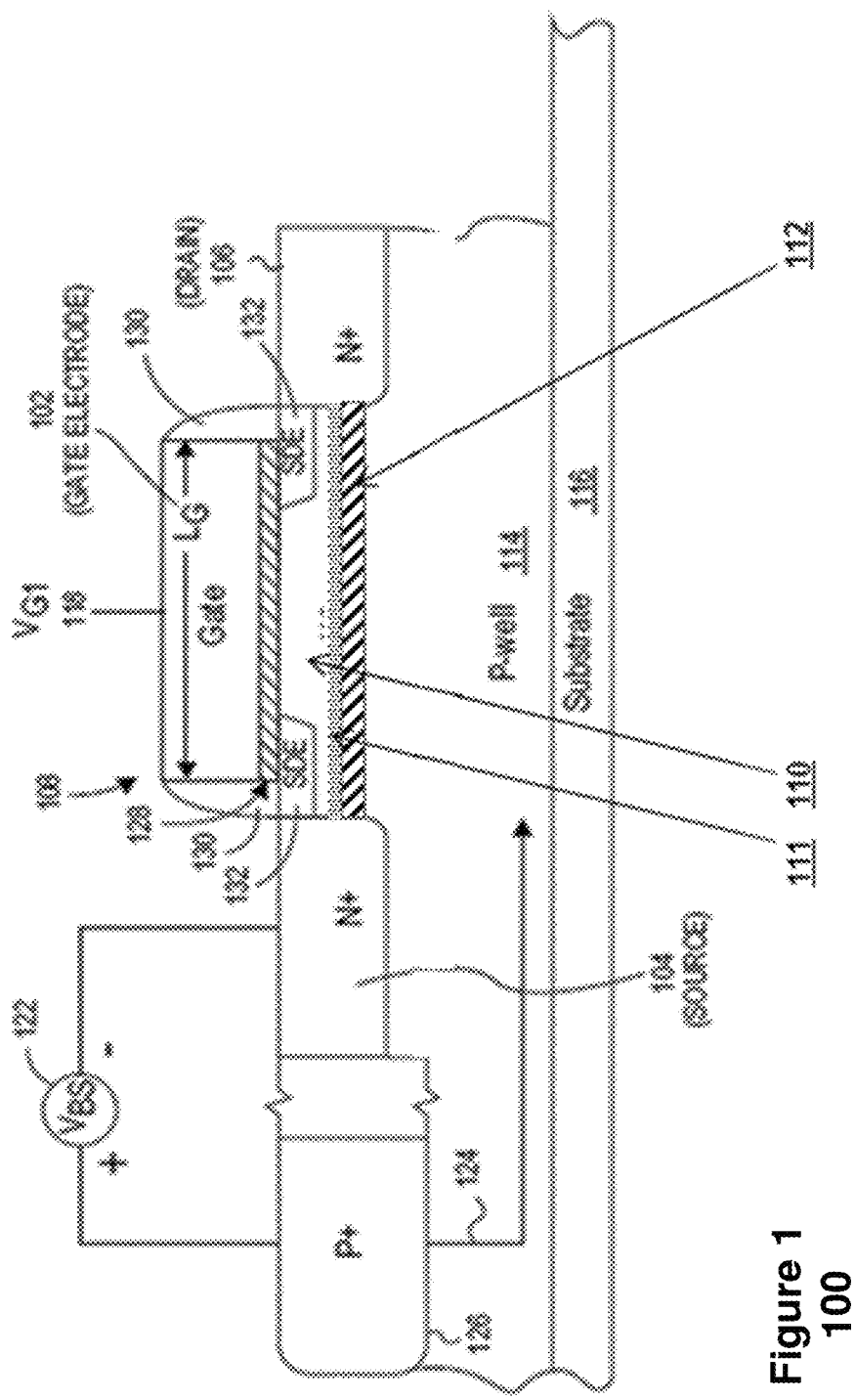
FIG. 1 shows an embodiment of an Enhanced Body Effect (EBE) transistor having an enhanced body coefficient, along with the ability to set threshold voltage with enhanced precision, according to certain described embodiments.

Embodiments are described with reference to the attached figures, wherein like reference numerals are used throughout the figures to designate similar or equivalent elements. The figures are not drawn to scale and they are provided merely to illustrate the embodiments. Several embodiments are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. Embodiments not limited by the illustrated ordering of acts or events, as some acts may occur in different orders and/or concurrently with other acts or events. Furthermore, not all illustrated acts or events are required to implement an embodiment.

Various embodiments are directed to circuits and methods related to an improved SRAM cell having transistors that have an enhanced body coefficient to improve against variation that limits SRAM designs and can rid the layout of notches and jogs. The various embodiments include circuits and methods in which the improved SRAM cell results from the use of transistors that have reduced variability of threshold voltage. By using such transistors, the SRAM cell can have an enhanced stability. Specifically, the various embodiments utilize Enhanced Body Effect (EBE) transistors.

FIG. 1 shows an embodiment of an EBE transistor 100 having an enhanced body coefficient, along with the ability to set threshold voltage Vt with enhanced precision, according to certain described embodiments. The EBE transistor 100 includes a gate electrode 102, source 104, drain 106, and a gate dielectric 128 positioned over a substantially undoped channel 110. As used herein, the term "substantially undoped" refers to a doping of less than $5\times10^{17}$ atoms/cm$^3$. Lightly doped source and drain extensions (SDE) 132, positioned respectively adjacent to source 104 and drain 106, extend toward each other, setting the transistor channel length.

In FIG. 1, the EBE transistor 100 is shown as an N-channel transistor having a source 104 and drain 106 made of N-type dopant material, formed upon a substrate such as a P-type doped silicon substrate providing a P-well 114 formed on a substrate 116. In addition, the N-channel EBE transistor in FIG. 1 includes a highly doped screening region 112 made of P-type dopant material, and a threshold voltage set region 111 made of P-type dopant material. However, it will be understood that, with appropriate changes to dopant materials, a P-channel EBE transistor can be formed.

In one embodiment, a process for forming the EBE transistor begins with forming the screening region 112. In certain embodiments, the screening region is formed by implanting dopants into the P-well 114. In alternative embodiments the screening region is formed on the P-well using methods such as in-situ doped epitaxial silicon deposition, or epitaxial silicon deposition followed by dopant implantation. The screening region formation step can be before or after STI (shallow trench isolation) formation, depending on the application and results desired. Boron (B), Indium (I), or other P-type materials may be used for P-type implants, and arsenic (As), antimony (Sb) or phosphorous (P) and other N-type materials can be used for N-type implants. In certain embodiments, the screening region 112 can have a dopant concentration between about $1\times10^{19}$ to $5\times10^{20}$ dopant atoms/cm$^3$, with the selected dopant concentration dependent on the desired threshold voltage as well as other desired transistor characteristics. A germanium (Ge), carbon (C), or other dopant migration resistant layer can be incorporated above the screening region to reduce upward migration of dopants. The dopant migration resistant layer can be formed by way of ion implantation, in-situ doped epitaxial growth or other process.

In certain embodiments, a threshold voltage set region 111 is positioned above the screening region 112. The threshold voltage set region 111 can be either adjacent to, incorporated within or vertically offset from the screening region. In certain embodiments, the threshold voltage set region 111 is formed by delta doping, controlled in-situ deposition, or atomic layer deposition. In alternative embodiments, the threshold voltage set region 111 can be formed by way of controlled outdiffusion of dopant material from the screening region 112 into an undoped epitaxial layer, or by way of a separate implantation into the substrate following formation of the screening region 112, before the undoped epitaxial layer is formed. Setting of the threshold voltage for the transistor is implemented by suitably selecting dopant concentration and thickness of the threshold voltage set region 111, as well as maintaining a separation of the threshold voltage set region 111 from the gate dielectric 128, leaving a substantially undoped channel layer directly adjacent to the gate dielectric 128. In certain embodiments, the threshold voltage set region 111 can have a dopant concentration between about $1\times10^{18}$ dopant atoms/cm$^3$ and about $5\times10^{19}$ dopant atoms per cm$^3$. In alternative embodiments, the threshold voltage set region 111 can have a dopant concentration that is approximately less than half of the concentration of dopants in the screening region 112. In certain embodiments, the final layer of the channel is formed above the screening region 112 and threshold voltage set region 111 by way of a blanket or selective EPI deposition, to result in a substantially undoped channel region 110 of a thickness tailored to the technical specifications of the device. As a general matter, the thickness of the substantially undoped channel region 110 ranges from approximately 5-25 nm, with the selected thickness based upon the desired threshold voltage for the transistor. Preferably, a blanket EPI deposition step is performed after forming the screening region 112, and the threshold voltage setting region 111 is formed by controlled outdiffusion of dopants from the screening region 112 into a portion of the blanket EPI layer, as described below. Dopant migration resistant layers of C, Ge, or the like can be utilized as needed, especially in the NMOS regions, to prevent dopant migration from the threshold voltage set region 111 into the substantially undoped channel region 110, or alternatively from the screening region 112 into the threshold voltage set region 111. STI structures are preferably formed after the blanket EPI deposition step, using a process that remains within a thermal budget that effectively avoids substantial change to the dopant profiles of the previously formed screening region 112 and threshold voltage setting region 111.

In addition to using dopant migration resistant layers, other techniques can be used to reduce upward migration of dopants from the screening region 112 and the threshold voltage set region 111, including but not limited to low temperature processing, selection or substitution of low migration dopants such as antimony or indium, low temperature or flash annealing to reduce interstitial dopant migration, or any other technique to reduce movement of dopant atoms can be used.

As described above, the substantially undoped channel region 110 is positioned above the threshold voltage set region 111. Preferably, the substantially undoped channel region 110 has a dopant concentration less than $5\times10^{17}$ dopant atoms per cm$^3$ adjacent or near the gate dielectric 128. In some embodiments, the substantially undoped channel region 110 can have a dopant concentration that is specified to be approximately less than one tenth of the dopant concentration in the screening region 112. In still other embodiments, depending on the transistor characteristics desired, the substantially undoped channel region 110 may contain dopants so that the dopant concentration is elevated to above $5 \times 10^{17}$ dopant atoms per $cm^3$ adjacent or near the gate dielectric 128. Preferably, the substantially undoped channel region 110 remains substantially undoped by avoiding the use of halo or other channel implants.

A gate stack may be formed or otherwise constructed above the substantially undoped channel region 110 in a number of different ways, from different materials including polysilicon and metals to form what is known as "high-k metal gate". The metal gate process flow may be "gate $1^{st}$" or "gate last". Preferably, the metal gate materials for NMOS and PMOS are selected to near mid-gap, to take full advantage of the EBE transistor. However, traditional metal gate work function band-gap settings may also be used. In one scheme, as a way to attain the desired work functions for given devices, metal gate materials can be switched between NMOS and PMOS pairs. Following formation of the gate stack, source/drain portions may be formed. Typically, the extension portions are implanted, followed by additional spacer formation and then implant or, alternatively, selective epitaxial deposition of deep source/drain regions.

The source 104 and drain 106 can be formed preferably using conventional processes and materials such as ion implantation and in-situ doped epitaxial deposition. Source 104 and drain 106 may further include stress inducing source/drain structures, raised and/or recessed source/drains, asymmetrically doped, counter-doped or crystal structure modified source/drains, or implant doping of source/drain extension regions according to LDD (lightly doped drain) techniques, provided that the thermal budget for any anneal steps be within the boundaries of what is required to keep the screening region 112 and threshold voltage setting region 111 substantially intact. The channel 110 contacts and extends between the source 104 and the drain 106, and supports movement of mobile charge carriers between the source and the drain. In operation, when gate electrode voltage is applied to the EBE transistor 100 at a predetermined level, a depletion region formed in the substantially undoped channel 110 can extend to the screening region 112, since channel depletion depth is a function of the integrated charge from dopants in the doped channel lattice, and the substantially undoped channel 110 has very few dopants. The screening region 112, if fabricated according to specification, effectively pins the depletion region to define the depletion zone width. The threshold voltage in conventional field effect transistors (FETs) can be set by directly implanting a "threshold voltage implant" into the channel, raising the threshold voltage to an acceptable level that reduces transistor off-state leakage while still allowing speedy transistor switching.

The threshold voltage in conventional field effect transistors (FETs) can be set by directly implanting a "threshold voltage implant" into the channel, raising the threshold voltage to an acceptable level that reduces transistor off-state leakage while still allowing speedy transistor switching. Alternatively, the threshold voltage ($V_t$) in conventional FETs can also be set by a technique variously known as "halo" implants, high angle implants, or pocket implants. Such implants create a localized, graded dopant distribution near a transistor source and drain that extends a distance into the channel. Halo implants are often required by transistor designers who want to reduce unwanted source/drain leakage conduction or "punch through" current, but have the added advantage of adjusting threshold voltage. Unfortunately, halo implants introduce additional process steps thereby increasing the manufacturing cost. Also, halo implants can introduce additional dopants in random, unwanted locations in the channel. These additional dopants increase the variability of threshold voltage between transistors, and decrease mobility and channel transconductance due to the adverse effects of additional and unwanted dopant scattering centers in the channel. Eliminating or greatly reducing the number of halo implants is desirable for reducing manufacture time and making more reliable wafer processing. By contrast, the techniques for forming the EBE transistor 100 use different threshold voltage setting techniques that do not rely on halo implants (i.e. haloless processing) or channel implants to set the threshold voltage to a desired range. By maintaining a substantially undoped channel near the gate, the EBE transistor further allows for greater channel mobility for electron and hole carriers with improved variation in threshold voltage from device to device.

As will also be appreciated, position, concentration, and thickness of the screening region 112 are important factors in the design of the EBE transistor. In certain embodiments, the screening region is located above the bottom of the source and drain junctions. To dope the screening region so as to cause its peak dopant concentration to define the edge of the depletion width when the transistor is turned on, methods such as delta doping, broad dopant implants, or in-situ doping is preferred, since the screening region 112 should have a finite thickness to enable the screening region 112 to adequately screen the well therebelow while avoiding creating a path for excessive junction leakage. When transistors are configured to have such screening regions, the transistor can simultaneously have good threshold voltage matching, high output resistance, low junction leakage, good short channel effects, and still have an independently controllable body due to a strong body effect. In addition, multiple EBE transistors having different threshold voltages can be easily implemented by customizing the position, thickness, and dopant concentration of the threshold voltage set region 111 and/or the screening region 112 while at the same time achieving a reduction in the threshold voltage variation. In one embodiment, the screening region is positioned such that the top surface of the screening region is located approximately at a distance of Lg/1.5 to Lg/5 below the gate (where Lg is the gate length). In one embodiment, the threshold voltage set region has a dopant concentration that is approximately $\frac{1}{10}$ of the screening region dopant concentration. In certain embodiments, the threshold voltage set region is thin so that the combination of the threshold voltage set region and the screening region is located approximately within a distance of Lg/1.5 to Lg/5 below the gate.

Modifying threshold voltage by use of a threshold voltage set region 111 positioned above the screening region 112 and below the substantially undoped channel 110 is an alternative technique to conventional threshold voltage implants for adjusting threshold voltage. Care must be taken to prevent dopant migration into the substantially undoped channel 110, and use of low temperature anneals and anti-migration materials, such as carbon or germanium, are recommended for many applications. More information about the formation of the threshold voltage set region 111 and the EBE transistor is found in pending U.S. patent application Ser. No. 12/895,785 filed Sep. 30, 2010 and entitled ADVANCED TRANSISTORS WITH THRESHOLD VOLTAGE SET DOPANT STRUCTURES, the entirety of which disclosure in herein incorporated by reference.

Yet another technique for modifying threshold voltage relies on selection of a gate material having a suitable work function. The gate electrode 102 can be formed from conventional materials, preferably including, but not limited to, metals, metal alloys, metal nitrides and metal silicides, as well as laminates thereof and composites thereof. In certain embodiments the gate electrode 102 may also be formed from polysilicon, including, for example, highly doped polysilicon and polysilicon-germanium alloy. Metals or metal alloys may include those containing aluminum, titanium, tantalum, or nitrides thereof, including titanium containing compounds such as titanium nitride. Formation of the gate electrode 102 can include silicide methods, chemical vapor deposition methods and physical vapor deposition methods, such as, but not limited to, evaporative methods and sputtering methods. Typically, the gate electrode 102 has an overall thickness from about 1 to about 500 nanometers. In certain embodiments, metals having a work function intermediate between band edge and mid-gap can be selected. As discussed in pending U.S. patent application Ser. No. 12/960,266, filed Dec. 3, 2010 and entitled SEMICONDUCTOR STRUCTURE AND METHOD OF FABRICATION THEREOF WITH MIXED METAL TYPES, the entirety of which disclosure is herein incorporated by reference, such metal gates simplify swapping of PMOS and NMOS gate metals to allow a reduction in mask steps and different required metal types for systems on a chip or other die supporting multiple transistor types.

Applied bias to the screening region 112 is yet another technique for modifying threshold voltage of the EBE 100. The screening region 112 sets the body effect for the transistor and allows for a higher body effect than is found in conventional FET technologies. For example, a body tap 126 to the screening region 112 of the EBE transistor can be formed in order to provide further control of threshold voltage. The applied bias can be either reverse or forward biased, and can result in significant changes to threshold voltage. Bias can be static or dynamic, and can be applied to isolated transistors, or to groups of transistors that share a common well. Biasing can be static to set threshold voltage at a fixed set point, or dynamic, to adjust to changes in transistor operating conditions or requirements. Various suitable biasing techniques are disclosed in pending U.S. patent application Ser. No. 12/708,497 filed Feb. 18, 2010 now U.S. Pat. No. 8,273,617, the entirety of which disclosure is herein incorporated by reference.

Advantageously, EBE transistors have a reduced mismatch arising from scattered or random dopant variations as compared to conventional MOS transistors. In certain embodiments, the reduced variation results from the adoption of structures such as the screening region, the optional threshold voltage set region, and the epitaxially grown channel region. In certain alternative embodiments, mismatch between EBE transistors can be reduced by implanting the screening layer across multiple EBE transistors before the creation of transistor isolation structures, and forming the channel layer as a blanket epitaxial layer that is grown before the creation of transistor epitaxial structures. In certain embodiments, the screening region has a substantially uniform concentration of dopants in a lateral plane. The EBE transistor can be formed using a semiconductor process having a thermal budget that allows for a reasonable throughput while managing the diffusivities of the dopants in the channel. Further examples of transistor structure and manufacture suitable for use in EBE transistors are disclosed in U.S. patent application Ser. No. 12/708,497, filed on Feb. 18, 2010 and entitled ELECTRONIC DEVICES AND SYSTEMS, AND METHODS FOR MAKING AND USING THE SAME now U.S. Pat. No. 8,273,617, as well as U.S. patent application Ser. No. 12/971,884, filed on Dec. 17, 2010 and entitled LOW POWER SEMICONDUCTOR TRANSISTOR STRUCTURE AND METHOD OF FABRICATION THEREOF and U.S. patent application Ser. No. 12/971,955 filed on Dec. 17, 2010 and entitled TRANSISTOR WITH THRESHOLD VOLTAGE SET NOTCH AND METHOD OF FABRICATION THEREOF, the respective contents of which are incorporated by reference herein.

Figure 2:
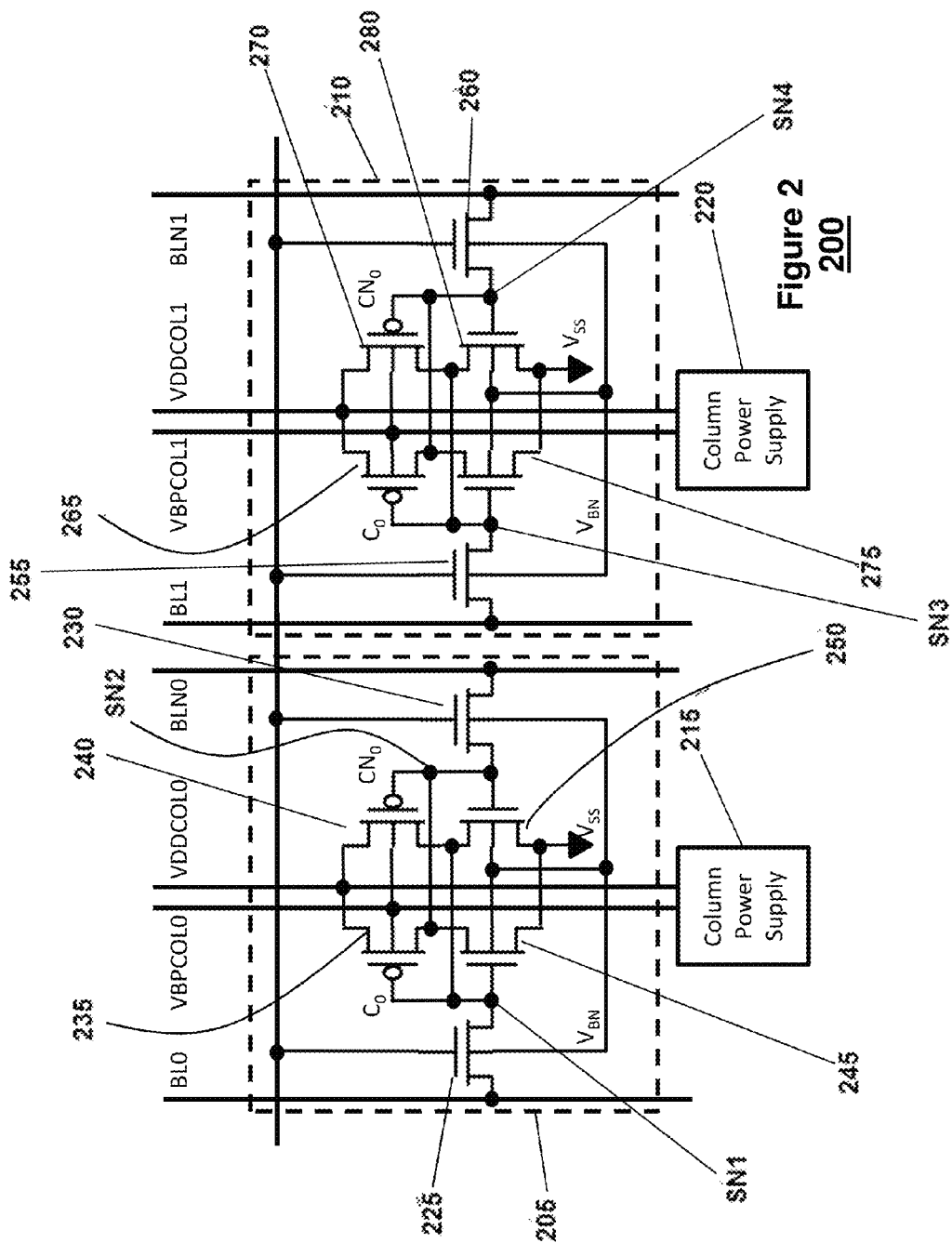
FIG. 2 shows an integrated circuit device according to an embodiment.

Referring initially to FIG. 2, an integrated circuit device according to an embodiment is shown in a block diagram and designated by the general reference character 200. Integrated circuit 200 is a Static Random Access Memory (SRAM) device that may include a number of SRAM cells, including SRAM cells arranged in multiple rows and columns. For ease of discussion, however, only two SRAM cells 205 and 210 are illustrated and discussed along with the associated column power supplies 215 and 220 to generate the applied power supply voltages. The SRAM cells 205 and 210 are implemented using EBE transistors.

In FIG. 2, the SRAM cell 205 includes a pair of pass-gate EBE transistors 225 and 230, a pair of pull-up EBE transistors 235 and 240, and a pair of pull-down EBE transistors 245 and 250. The pass-gate EBE transistors 225 and 230 and the pull-down EBE transistors 245 and 250 are typically NMOS transistors. The pass-gate EBE transistors 225 and 230 couple a pair of data lines BL0 and BLN0, also referred to as "bit lines", to storage nodes SN1 and SN2 respectively, where the voltages at nodes SN1 and SN2 are inversely related. The pull-down EBE transistors 245 and 250 couple a power supply VSS, usually the ground voltage of the circuit, to the storage nodes SN1 and SN2 respectively. The pull-up EBE transistors 235 and 240 are typically PMOS transistors that couple the positive power supply VDDCOL0 to the storage nodes SN1 and SN2 respectively. The substrates of the NMOS transistors are connected to the ground voltage of the circuit, and the substrates for the PMOS transistors are connected to a power supply voltage VBPCOL0. SRAM cell 210 is similar, and includes a pair of pass-gate EBE transistors 255 and 260, a pair of pull-up EBE transistors 265 and 270, a pair of pull-down EBE transistors 275 and 280, storage nodes SN3 and SN4, bit lines BL1 and BLN1, and power supplies VDDCOL1 and VBPCOL1 (forward and reverse) body bias voltages required in different modules or circuit blocks in the SoC.

In FIG. 2, each column of the SRAM 200 includes a column power supply block that supplies the power supply voltage for the corresponding column. The column power supply block 215 supplies the power supply voltage VDDCOL0 and body bias voltage VBPCOL0, and the column power supply block 220 supplies the power supply voltage VDDCOL1 and body bias voltage VBPCOL1. Each column power supply block independently controls the power supply voltage and PMOS pull-up transistor body bias voltage supplied to each column such that each column can receive different power supply and body bias voltages. In addition, the column power supply block can provide different power supply voltages and body bias voltages to the same column at different times, or during different modes of operation. For example, as described in more detail below, the column power supply block can supply different power supply voltages and/or body bias voltages to the corresponding column during read and write operations.

The SRAM cell shown in FIG. 2 can retain its state indefinitely as long as the supplied power is sufficient to operate the cell correctly. The SRAM cell 205 includes two cross-coupled inverters consisting of the pair of transistors 235 and 245, and 240 and 250. The two inverters operate to reinforce the stored charge on storage nodes SN1 and SN2 continuously, such that the voltages at each of the two storage nodes are inverted with respect to one another. When SN1 is at a logical "1", usually a high voltage, SN2 is at a logical "0", usually a low voltage, and vice versa.

Referring to FIG. 2, a write operation can be performed to store data in a selected SRAM cell, and a read operation can be performed to access stored data in a selected SRAM cell. In one embodiment, data is stored in a selected SRAM cell, e.g. SRAM cell 205, during a write operation by placing complementary write data signals on the two bit lines BL0 and BLN0, and placing a positive voltage VWL on the word line WL connected to the gate of the pass-gate transistors 225 and 230, such that the two bits lines are coupled to the storage nodes SN1 and SN2 respectively. The write operation is successful when the write data signals on the two bit lines overcome the voltages on the two storage nodes and modify the state of the SRAM cell. The cell write is primarily due to the bit line driven low overpowering the PMOS pull-up transistor via the pass-gate transistor. Thus the relative strength ratio of the NMOS pass-gate transistor to the PMOS pull-up transistor (represented by the width to length ratio of these transistors) is important to maximizing the write margin. Data is accessed from a selected SRAM cell, e.g. SRAM cell 205, during a read operation by placing a positive voltage VWL on the word line WL such that the pass-gate transistors 225 and 230 allow the storage nodes SN1 and SN2 to be coupled to the bit lines BL0 and BLN0 respectively. During the read operation the SRAM cell 205 drives complementary read data signals onto the bit lines BL0 and BLN0. The differential voltage on the bit lines BL0 and BLN0 can be sensed using a differential sense amplifier (not shown) that senses and amplifies the differential voltage signal on the bit lines. The output of the sense amplifier is subsequently output as the read data for the selected SRAM cell.

It is noted that one or more of the cells of the SRAM 200 can include a plurality of word lines and bit lines, even though only one word line and two sets of bits lines have been shown in FIG. 2. Therefore, even though only two SRAM cells 205 and 210 are shown in FIG. 2, other SRAM cells (not shown) can be placed at intersections of the plurality of word lines and bit lines. In some embodiments, the SRAM 200 can have 8, 16, 32, 64, 128 or more columns that can be arranged in word widths of 8, 16, 32, 64, 128, 256, or more cells. In some embodiments, each column of the SRAM 200 has an associated column power supply block that independently controls the column power supply voltages provided to the corresponding column. In alternative embodiments, each column of the SRAM 200 can be sub-divided into column sub-groups, where each column sub-group has an associated column power supply block that independently controls the column power supply voltages provided to corresponding column subgroup. In certain other embodiments, one column power supply block can be associated with more than one column or column subgroup. In addition, power supply and body bias voltages other than the ones described above may be applied to the SRAM cells of SRAM 200 during read and write operations. Such power supply voltages can be selected based on the design of the SRAM cell, and the electrical characteristics of the EBE transistors used in the SRAM cell.

Embodiments of SRAM cells using EBE transistors for at least some of the transistors have enhanced performance characteristics as compared to SRAM cells using all conventional MOSFETs. Some of the reasons for the enhanced performance characteristics are (1) the EBE transistors have lower threshold voltage variation, i.e., lower $\sigma V_T$, and (2) the EBE transistors have higher $I_{eff}$ and higher body coefficient. As a result, SRAM cells using EBE transistors can have (1) enhanced read stability that can be measured as enhanced read static noise margin, as well as lower SRAM minimum operating voltage $V_{DDmin}$; (2) enhanced write margin; (3) faster SRAM operation resulting from lower read current variability; and (4) lower SRAM cell leakage resulting from lower $\sigma V_T$.

Figure 3:
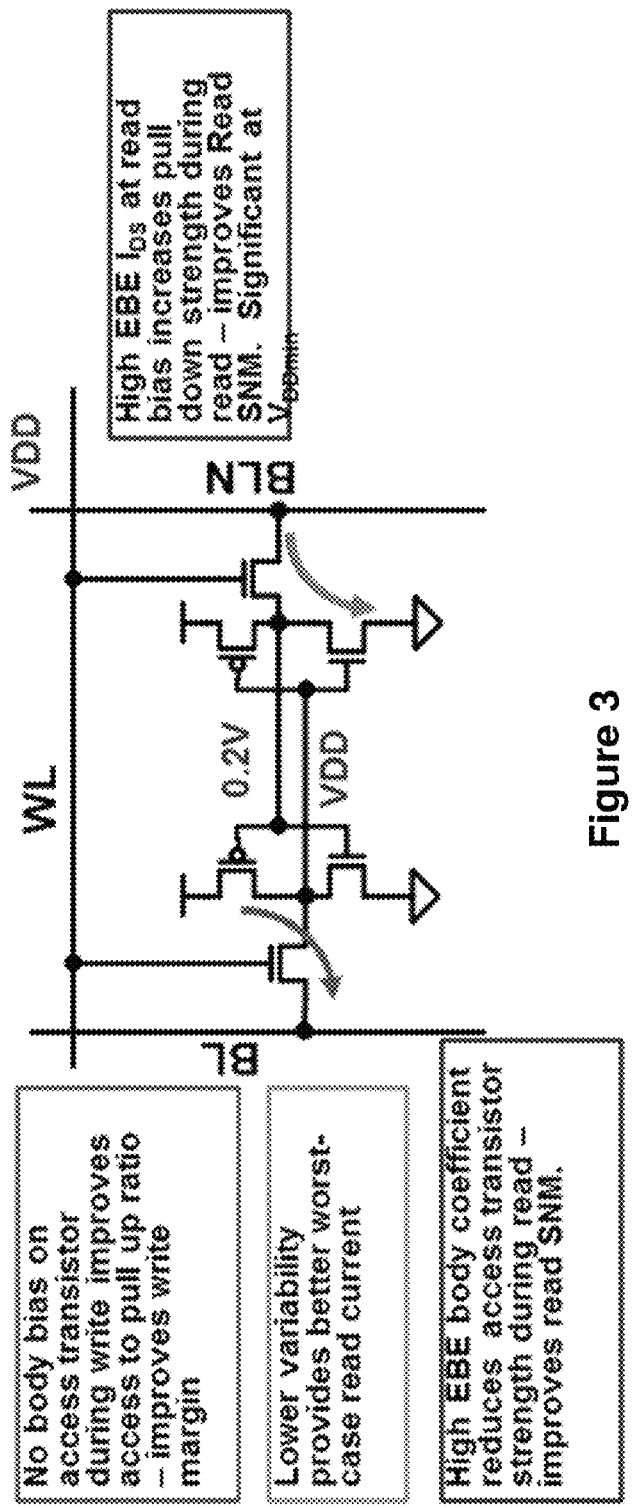
FIG. 3 shows an annotated SRAM cell, according to an embodiment, that illustrates some of the EBE transistor characteristics that can provide an SRAM cell with enhanced performance characteristics.
Figure 4:
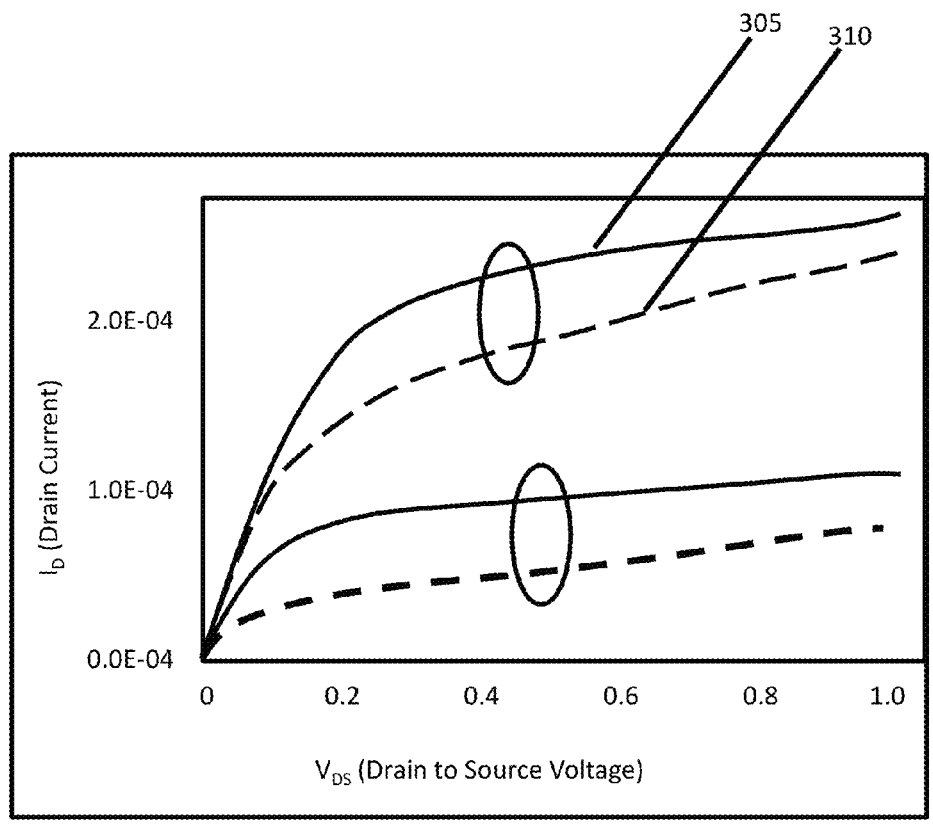
FIG. 4 is a plot of the drain current as a function of the drain voltage for an EBE transistor according to an embodiment and a conventional transistor.

FIG. 3 shows an annotated SRAM cell that illustrates some of the EBE transistor characteristics that can provide an SRAM cell with enhanced performance characteristics. The EBE transistors can exhibit a higher current drive as compared to conventional transistors, when a low voltage is being applied to the gate and the drain to source voltage is less than $V_{GS}-V_T$ of the transistor, i.e., such that the transistor is operating in the linear mode. This higher current drive is illustrated in FIG. 4, which shows the drain current as a function of the drain voltage for an EBE transistor, curve 305, and a conventional transistor, curve 310. As shown in FIG. 4, the EBE transistor drain current can be 1.5-2 times the drain current of the conventional transistor when the transistor is operating in the linear mode and reduced $V_{GS}$, which may occur due to the circuit operating at reduced VDD. The drain to source voltage on NMOS pull-down transistors of the SRAM cell is diminished during a read operation (this voltage directly relates to the read SNM as described previously), and therefore, these transistors operate in the linear region during a read operation. This voltage $V_{CN}$ can be less than 0.2 V in certain embodiments. This voltage can be as low as 0.1 volts in certain alternative embodiments. The NMOS pass-gate transistor connected to the NMOS pull-down transistor is operating in saturation during the important portions of the read operation, and therefore, does not benefit from this enhanced current drive capability. However, the NMOS pass-gate transistor has an increased body bias voltage that results from the rise in the storage node voltage during the read operation. Therefore, the enhanced body coefficient of the EBE transistor results in a NMOS pass-gate transistor with reduced current drive capability. The combination of the enhanced drive capability of the pull-down transistor, and the reduced drive capability of the pass-gate transistor result in an increased read SNM and increased cell stability. This is evident qualitatively by the better voltage divider ratio obtained by weakening the pass-gate and strengthening the pull-down NMOS transistors, respectively. The increase in the read SNM and cell stability can be determined from butterfly curves obtained from SPICE simulations of the SRAM cell using EBE transistors.

FIG. 3 also shows that the SRAM cell using EBE transistors may not have a significant impact on the write ability of the SRAM cell when the bitline BL is driven to VSS because the pass-gate NMOS transistor has no body bias voltage under these conditions. However, during a write margin measurement the bitline BL is swept from VDD to VSS, and therefore, there is a body effect that has an impact on the measured write margin. In certain embodiments of the SRAM cell, the write margin is not a limitation as the read SNM can be the dominant limitation that determines the design of the SRAM cell. In addition, the lower variability of the threshold voltage of the EBE transistor, resulting from the lower $\sigma V_T$, results in higher worst case read current. The enhanced body coefficient of the EBE transistor can also be used to provide SRAM cells having a lower standby power, and better column level margin controls. Additional benefits of an SRAM cell using EBE transistors are discussed in pending U.S. patent application Ser. No. 13/471,353, filed May 14, 2012 and entitled INTEGRATED CIRCUIT DEVICES AND METHODS, the entirety of which disclosure is herein incorporated by reference. As discussed above, EBE transistors having a screening region have enhanced threshold voltage matching, in addition to having an enhanced body coefficient. Therefore, SRAMs using EBE transistors have reduced threshold voltage variations between the transistors used in different cells of the SRAM, as well as between the transistors used within a particular SRAM cell. An SRAM cell using EBE transistors also has increased read SNM and cell stability as a result of the reduced threshold voltage variations. Reduction of threshold voltage variation between the pass-gate transistors and the pull-down transistors within an SRAM cell contributes in part to the increase in read SNM. In addition, reduction in the threshold voltage variations of PMOS transistors in SRAM cells also contributes to the increase in read SNM, as well as less variability in write margin, i.e., an increase in worst-case as fabricated write margin.

Now turning to FIGS. 5A-8C, various methodologies for porting a source or existing SRAM cell using conventional transistors to a target SRAM cell using EBE transistors are described. In general, each of these process flows includes the following steps:

1) The design layout data for an integrated circuit is obtained and the source SRAM cells to be converted for use with EBE transistors are identified or selected.
2) The active area patterns (NMOS and PMOS) for these SRAM cells are extracted to form EBE active area layers or layouts (PMOS and NMOS). This involves removing these patterns from the corresponding conventional active areas or layouts. Thus, during subsequent processing to form conventional transistors, for instance, the EBE active areas in the SRAM are masked to prevent the introduction of additional dopants which would affect the EBE channel structure.
3) The NMOS EBE active area is adjusted to provide at least one of the following:
   a. A width of the EBE NMOS pull-down transistor that substantially matches the width of the EBE NMOS pass-gate transistor. For example, referring back to FIG. 2, the EBE NMOS active areas defining the widths of transistors 225, 230, 245, 250 are selected so that these transistors have the same width. In some embodiments, the resizing is based on reducing the width of the pull-down transistor, which is commonly larger in conventional SRAM cells, as discussed below.
   b. A reducing in at least one lateral dimension of the SRAM cell.
4) The gate layer is adjusted so that the length of the EBE PMOS pull-up transistors and the length of the EBE NMOS pull-down transistors are substantially the same. That is, referring back to FIG. 2, transistors 235, 240, 245, and 250 are selected so that these transistors have the same width. In some embodiments, this is done by reducing the length of the EBE PMOS pull-up transistors. In other embodiments, this is done by increasing the length of the EBE NMOS pull-down transistors.
5) Based on some criteria for the electrical parameters for the EBE transistors, the new layout for the gate layer, and the locations for the EBE and conventional active regions, the process parameters for the EBE transistors and conventional transistors built on EBE active areas are selected.
6) Appropriate masks can be produced and the integrated circuit can be formed.

Various exemplary flows are illustrated below.

Figure 5A:
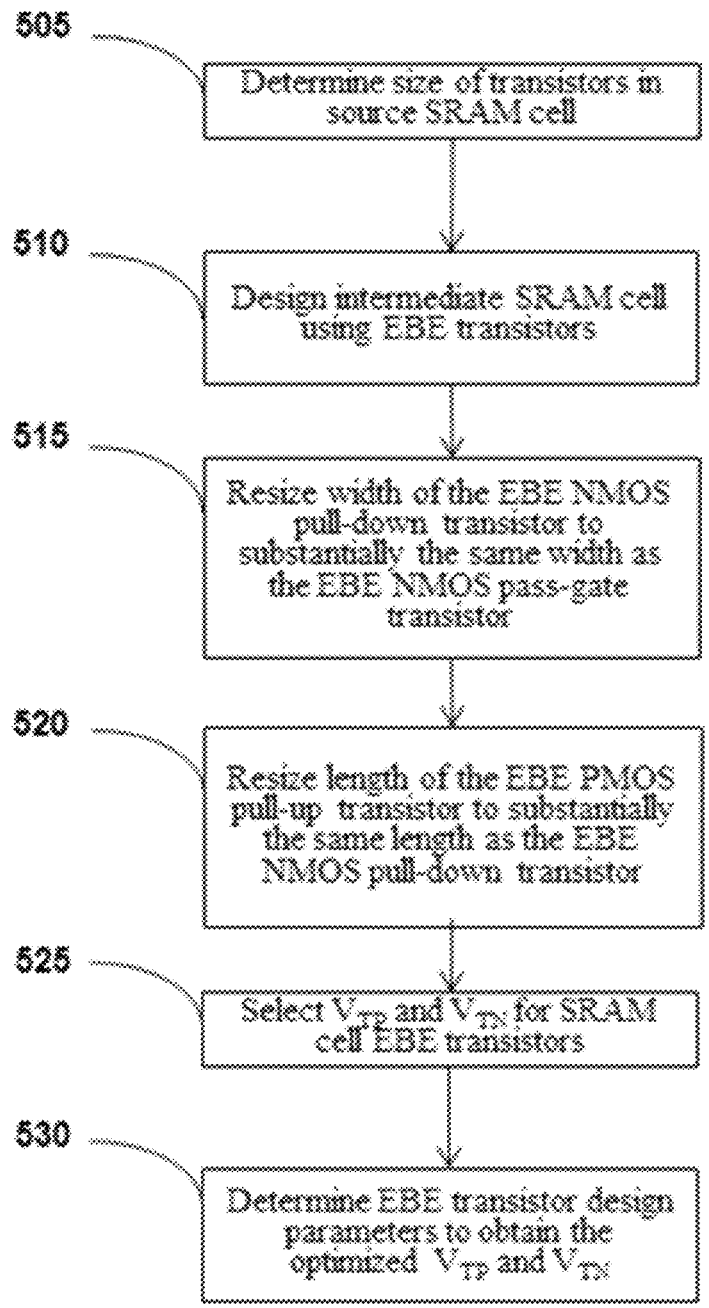
FIG. 5A is a flow diagram illustrating a method for porting a source SRAM cell using conventional transistors to a target SRAM cell using EBE transistors, in accordance with an embodiment.
Figure 5B:
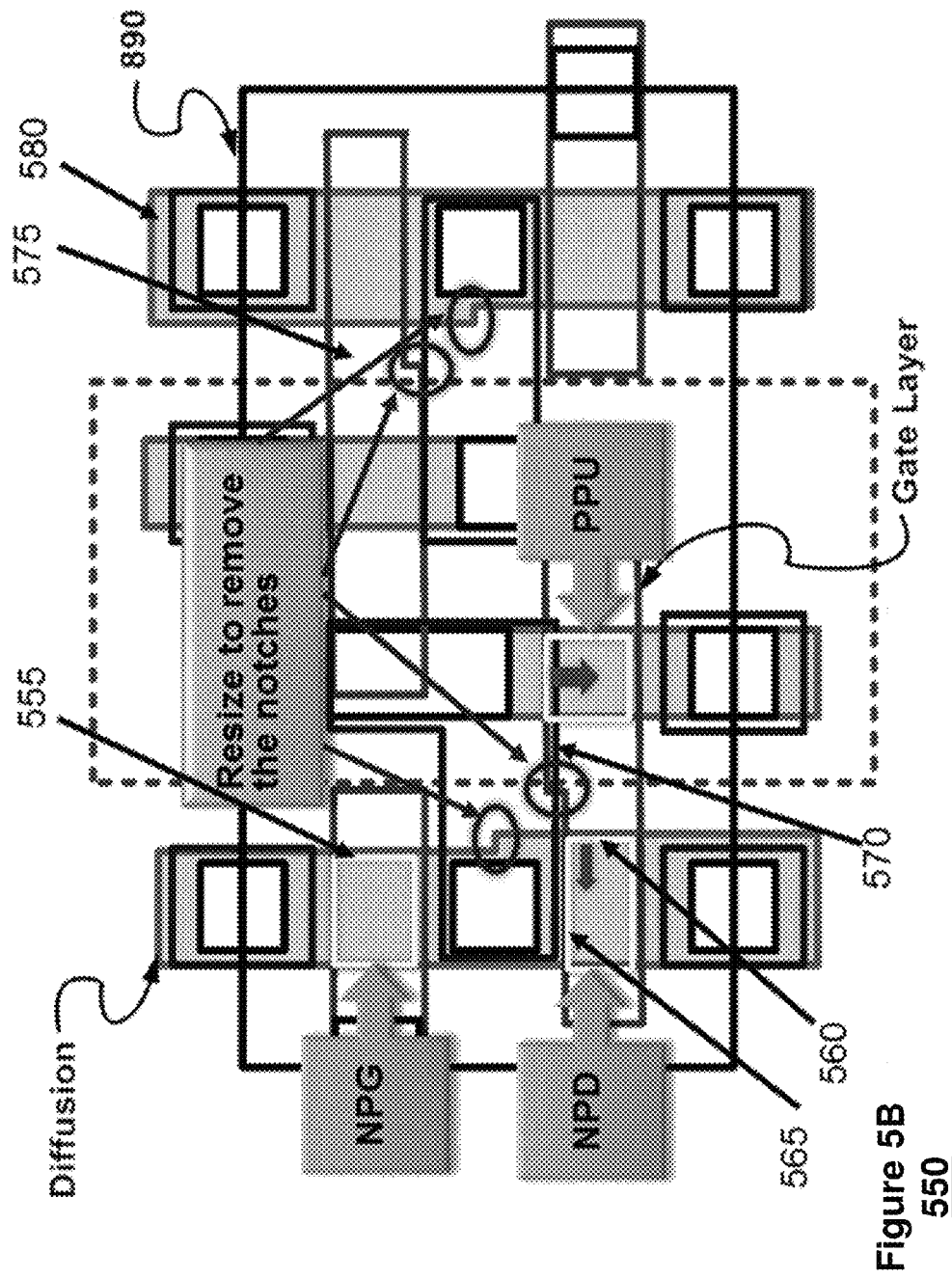
FIG. 5B is a layout of a 6T SRAM cell using EBE transistors illustrating the transistor size modifications that are performed to obtain the target SRAM cell, in accordance with the method of FIG. 5A.

FIG. 5A is a flow diagram illustrating a method 500 for porting a source SRAM cell using conventional transistors to a target SRAM cell using EBE transistors, in accordance with a first embodiment. FIG. 5B is a layout 550 of a 6T SRAM cell using EBE transistors illustrating the transistor size modifications that are performed to obtain the target SRAM cell, in accordance with the method 500.

With reference to the method 500 of FIG. 5A, in step 505, the size of the transistors in the source SRAM cell that uses conventional transistors is determined. In step 510, an intermediate SRAM cell is designed using EBE transistors. In one embodiment, the intermediate SRAM cell is a drop in replacement for the source SRAM cell and uses EBE transistors of substantially the same size (i.e. substantially the same width and length) as the source SRAM cell. Since the intermediate SRAM cell as a drop-in replacement preserves the width and length of the EBE NMOS pull-down transistor and the EBE NMOS pass-gate transistor, the NMOS active area of the intermediate SRAM cell can include a jog or a notch resulting from differing widths for the NMOS pull-down transistor and the NMOS pass-gate transistor. Similarly, there can be a jog in the gate layer for the EBE NMOS pull-down transistor and the EBE PMOS pull-up transistor resulting from the differing lengths of these two transistors relative to each other in the source SRAM cell. These jogs or notches in the NMOS active area and the gate layer are illustrated in the SRAM cell layout 550 (FIG. 5B).

Referring again to method 500 (FIG. 5A), in step 515, the width of the EBE NMOS pull-down transistor is resized to substantially the same width as the EBE NMOS pass-gate transistor, where the resizing may include substantially eliminating the jog or notch in the NMOS active area. In step 520, the length of the EBE PMOS pull-up transistor is resized to substantially the same length as the EBE NMOS pull-down transistor, where the resizing may include substantially eliminating the jog or notch in the gate layer. The extent of resizing in steps 515 and 520 can depend on the process used to fabricate the source SRAM cell and the target SRAM cell, and the layout of the source SRAM cell. In certain embodiments, the resizing performed in steps 515 and 520 can be approximately in the range of 2-30 nm. In step 525, the NMOS EBE transistor threshold voltage VTN and the PMOS EBE transistor threshold voltage VTP are selected. In one embodiment, VTN and VTP for the transistors in the SRAM cell are substantially matched to the threshold voltages of the EBE NMOS and EBE PMOS transistors used in logic gates in the same integrated circuit. In an alternative embodiment, the threshold voltages $V_{TN}$ and $V_{TP}$ for the EBE transistors used in the SRAM cell are set to provide enhanced and preselected performance characteristics for the target SRAM cell, such as, read margin, write margin, and cell leakage current. In step 530, EBE transistor process parameters to result in the selected VTN and VTP (step 525) are determined. Such process parameters can include one or a combination of the thickness of the blanket epitaxial layer, the position of the screening region, the position of the threshold voltage tuning region, and/or the dopant concentration of the threshold voltage tuning region or screening region or both.

With reference to FIG. 5B, the layout 550 corresponds to the intermediate SRAM cell using EBE transistors resulting from step 510 (FIG. 5A), in accordance with one embodiment. The annotations in FIG. 5B illustrate the resizing of the EBE transistors in the intermediate SRAM cell that are performed to substantially reduce or eliminate the jogs or notches in the NMOS active area and the gate layer, in accordance with the first embodiment. In layout 550, the width of the EBE NMOS pull-down transistor is reduced to substantially the same width as the EBE NMOS pass-gate transistor by moving the edge 560 of the diffusion region such that it is substantially aligned with the edge 555, as shown in FIG. 5B. In addition, the length of the EBE PMOS pull-up transistor is reduced to substantially the same length as the EBE NMOS pull-down transistor by moving the edge 570 of the gate layer such that it is substantially aligned with the edge 565, as shown in FIG. 5B. As a result of these changes the diffusion region between the gate of the EBE NMOS pass-gate transistor (labeled NPG in FIG. 5B) and the gate of the EBE NMOS pull-down transistor (labeled NPD in FIG. 5B) is substantially rectangular in the layout 550 of the target SRAM cell, and the edges of this rectangular region are substantially aligned with the NPD and NPG areas. In addition, the gate layer extending between areas PPU and NPD (corresponding to the gates of the EBE PMOS pull-up and the EBE NMOS pull-down transistors, respectively) is substantially rectangular for the target SRAM cell, and the edges of this rectangular gate layer are substantially aligned with the edges of the PPU and NPD areas. It is noted that even though these changes are illustrated with respect to one of the NMOS active area and one of the gates in FIG. 5B, the corresponding changes can also be made to the other NMOS active area 580 and the gate layer 575 to obtain a target SRAM cell that has substantially no jogs or notches in the NMOS active area and the gate layer.

Figure 6A:
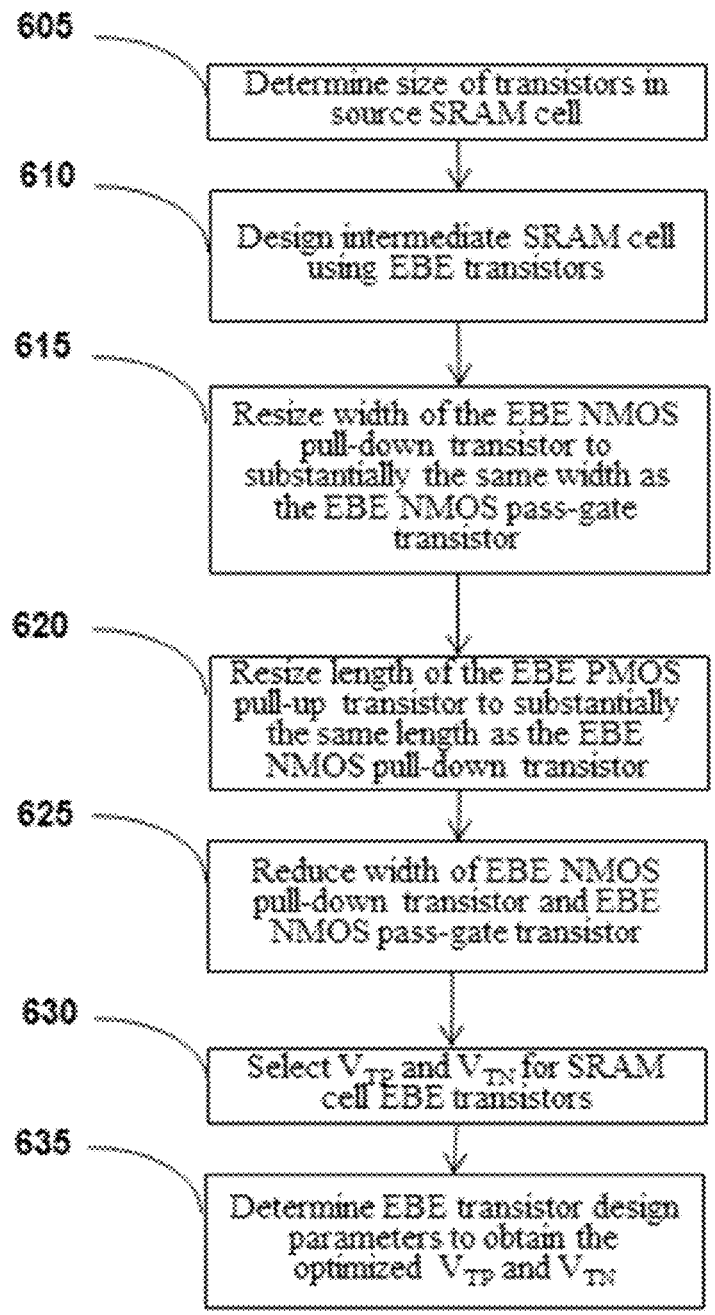
FIG. 6A is a flow diagram illustrating a method for porting a source SRAM cell using conventional transistors to a target SRAM cell using EBE transistors, in accordance with an embodiment.
Figure 6B:
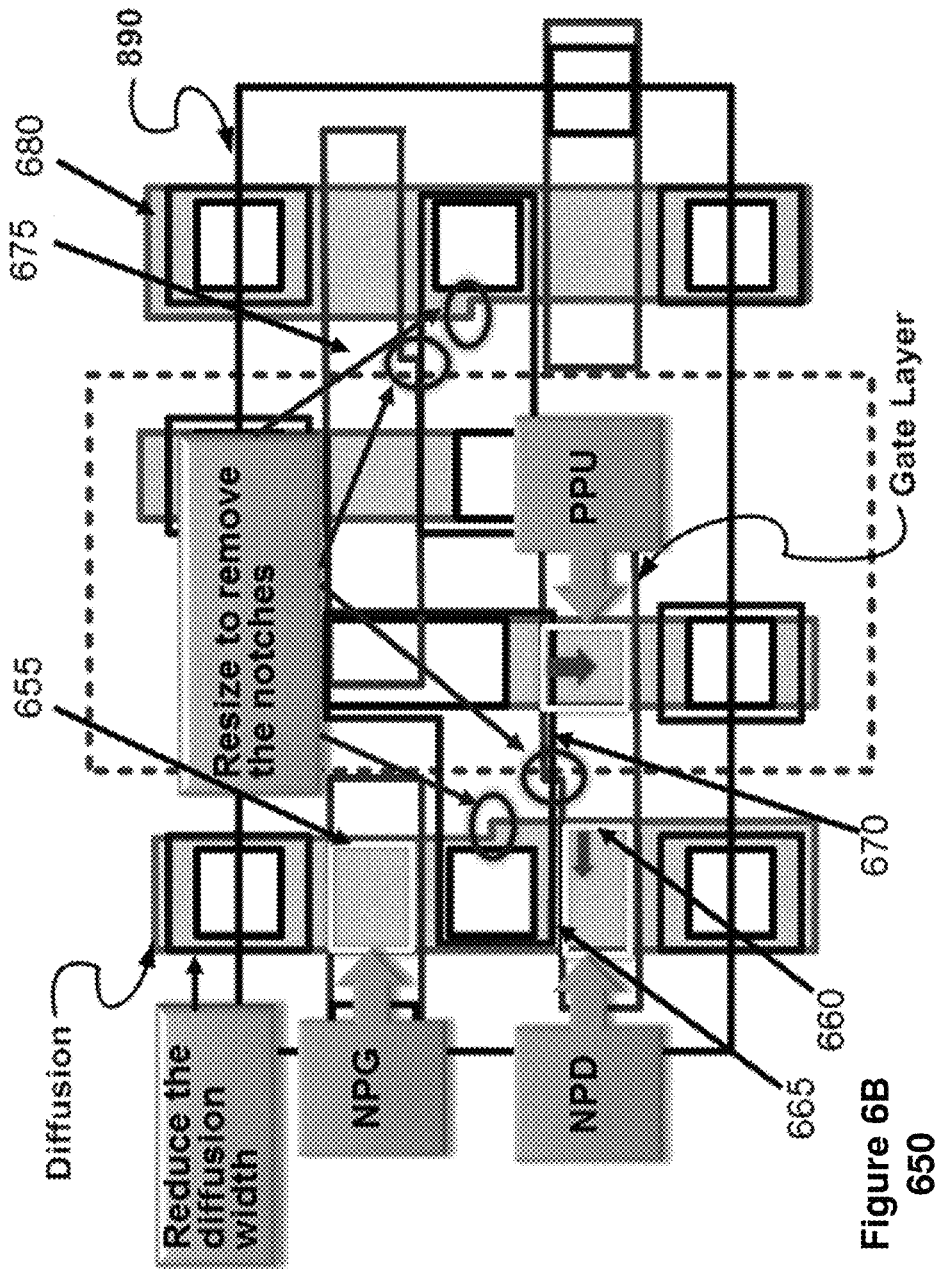
FIG. 6B is a layout of a 6T SRAM cell using EBE transistors illustrating the transistor size modifications that are performed to obtain the target SRAM cell, in accordance with the method of FIG. 6A.

FIG. 6A is a flow diagram illustrating a method 600 for porting a source SRAM cell using conventional transistors to a target SRAM cell using EBE transistors, in accordance with a second embodiment. FIG. 6B is a layout 650 of a 6T SRAM cell using EBE transistors illustrating the transistor size modifications that are performed to obtain the target SRAM cell, in accordance with the method 600.

With reference to the method 600 of FIG. 6A, in step 605 the size of the transistors in the source SRAM cell that uses conventional transistors is determined. In step 610, an intermediate SRAM cell is designed using EBE transistors. In one embodiment, the intermediate SRAM cell is a drop in replacement for the source SRAM cell and uses EBE transistors of substantially the same size (i.e. substantially the same width and length) as the source SRAM cell. Since the intermediate SRAM cell as a drop-in replacement preserves the width and length of the EBE NMOS pull-down transistor and the EBE NMOS pass-gate transistor, the NMOS active area of the intermediate SRAM cell can include a jog or a notch resulting from differing widths for the NMOS pull-down transistor and the NMOS pass-gate transistor. Similarly, there can be a jog or notch in the gate layer for the EBE NMOS pull-down transistor and the EBE PMOS pull-up transistor resulting from differing lengths of these two transistors in the source SRAM cell. These jogs or notches in the NMOS active area and the gate layer are illustrated in the SRAM cell layout 650 (FIG. 6B).

Referring again to method 600 (FIG. 6A), in step 615, the width of the EBE NMOS pull-down transistor is resized to substantially the same width as the EBE NMOS pass-gate transistor, to substantially eliminate the jog or notch in the NMOS active area. In step 620, the length of the EBE PMOS pull-up transistor is resized to be substantially the same length as the EBE NMOS pull-down transistor, which may result in substantially eliminating the jog in the gate layer. In step 625, the width of the NMOS active area is reduced, thereby reducing the width of both the EBE NMOS pull-down and pass-gate transistors. This results in a reduction of the overall width of the SRAM cell. For example, if the width of the NMOS active area is reduced by 10 nm, then the width of the SRAM cell is reduced by 20 nm as a result of the reduced width of the two NMOS active areas in the SRAM cell. The extent of resizing in steps 615, 620, and 625 can depend on the process used to fabricate the source SRAM cell and the target SRAM cell, and the layout of the source SRAM cell. In certain embodiments, the resizing performed in steps 615, 620, and 625 can be approximately in the range of 2-30 nm. In step 630, the NMOS EBE transistor threshold voltage VTN and the PMOS EBE transistor threshold voltage VTP are selected. In one embodiment, VTN and VTP for the transistors in the SRAM cell are selected to substantially match the threshold voltages of the EBE NMOS and EBE PMOS transistors used in logic gates in the same integrated circuit. In an alternative embodiment, the threshold voltages VTN and VTP for the EBE transistors used in the SRAM cell are set to provide enhanced and preselected performance characteristics for the target SRAM cell, such as, read margin, write margin, and cell leakage current. In step 635, EBE transistor process parameters for the selected VTN and VTP (selected in step 630) are determined. Such process parameters can include one or a combination of the thickness of the blanket epitaxial layer, the position of the screening region, the position of the threshold voltage tuning region, and/or the dopant concentration of the threshold voltage tuning region or screening region or both.

With reference to FIG. 6B, the layout 650 corresponds to the intermediate SRAM cell using EBE transistors resulting from step 610, in accordance with one embodiment. The annotations in FIG. 6B illustrate the resizing of the EBE transistors in the intermediate SRAM cell that are performed to obtain the target SRAM cell, in accordance with the second embodiment. In layout 650, the width of the EBE NMOS pull-down transistor is reduced to substantially the same width as the EBE NMOS pass-gate transistor by moving the edge 660 of the diffusion region such that it is substantially aligned with the edge 655, as shown in FIG. 6B. Also, the length of the EBE PMOS pull-up transistor is reduced to substantially the same length as the EBE NMOS pull-down transistor by moving the edge 670 of the gate layer such that it is substantially aligned with the edge 665, as shown in FIG. 6B. In addition to these changes, the width of the NMOS active area is reduced by reducing the width of the diffusion region to reduce the width of the SRAM cell, as shown in FIG. 6B. As a result of these changes, the diffusion region between the gate of the EBE NMOS pass-gate transistor (labeled NPG in FIG. 6B) and the gate of the EBE NMOS pull-down transistor (labeled NPD in FIG. 6B) is substantially rectangular for the target SRAM cell, and the edges of this rectangular region are substantially aligned with the edges of the NPG and NPD areas. In addition, the gate layer extending between the areas PPU and NPD (corresponding to the gates of the EBE PMOS pull-up and the EBE NMOS pull-down transistors, respectively) is substantially rectangular for the target SRAM cell, and the edges of this rectangular gate layer are substantially aligned with the edges of the PPU and NPD areas. It is noted that even though these changes are illustrated with respect to one of the NMOS active area and one of the gate layers in FIG. 6B, the corresponding changes can also be made to the other NMOS active area 675 and the gate layer 680 to obtain a target SRAM cell that has substantially no jogs or notches in the NMOS active area and the gate layer. In one embodiment, where the NMOS active area width is reduced by 10 nm, the target SRAM cell using EBE transistors has an overall width that is reduced by 20 nm compared to the source SRAM cell from which the EBE transistor-based SRAM cell is derived.

Figure 7A:
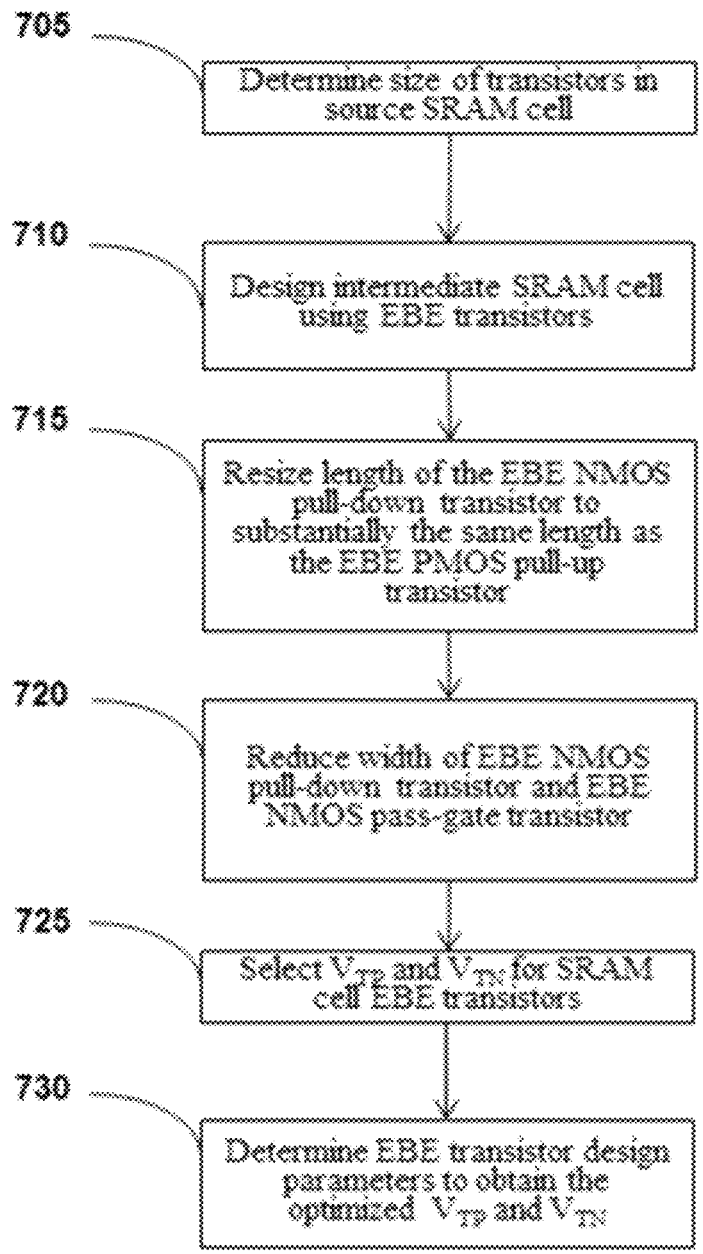
FIG. 7A is a flow diagram illustrating a method for porting a source SRAM cell using conventional transistors to a target SRAM cell using EBE transistors, in accordance with an embodiment.
Figure 7B:
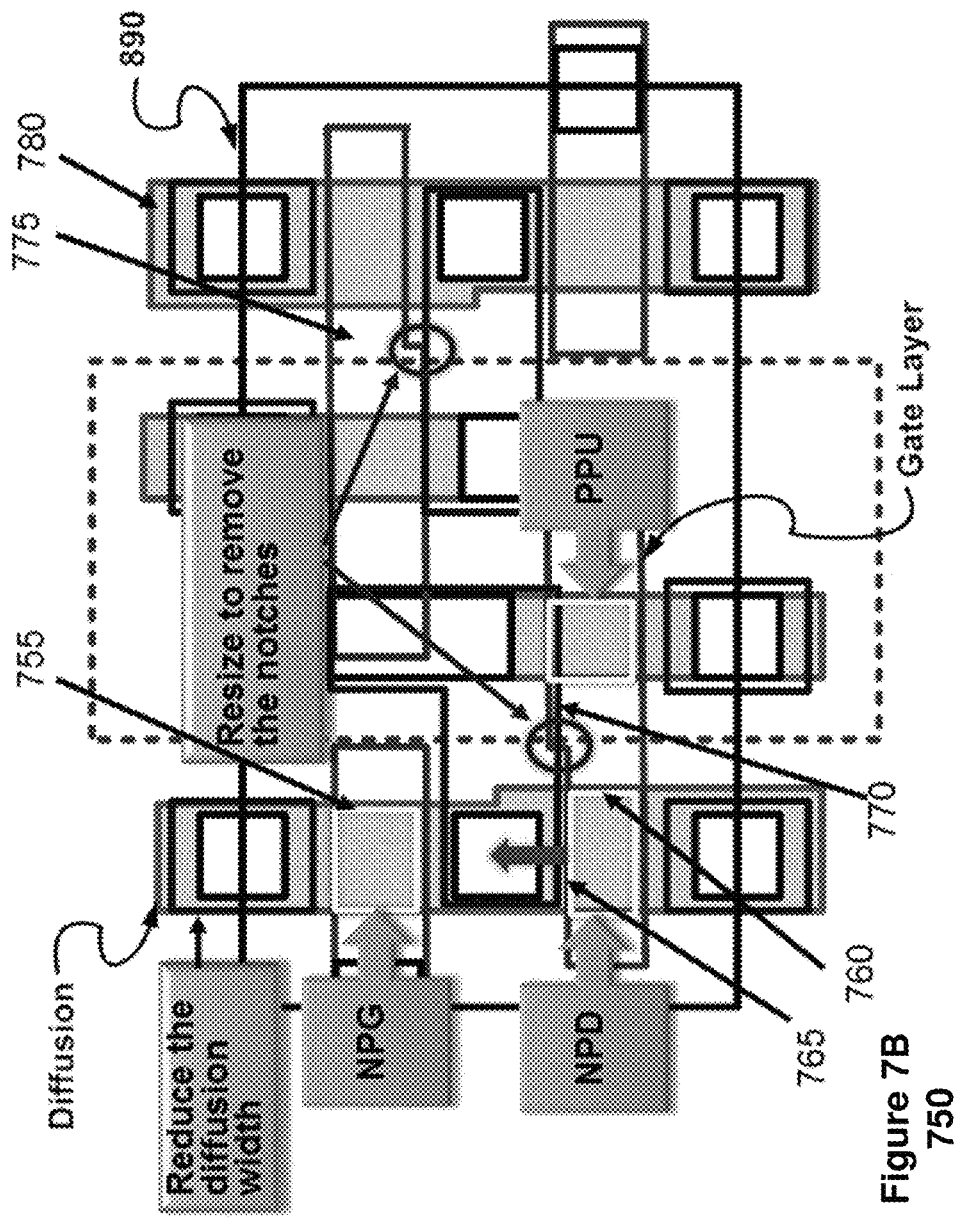
FIG. 7B is a layout of a 6T SRAM cell using EBE transistors illustrating the transistor size modifications that are performed to obtain the target SRAM cell, in accordance with the method.

FIG. 7A is a flow diagram illustrating a method 700 for porting a source SRAM cell using conventional transistors to a target SRAM cell using EBE transistors, in accordance with a third embodiment. FIG. 7B is a layout 750 of a 6T SRAM cell using EBE transistors illustrating the transistor size modifications that are performed to obtain the target SRAM cell, in accordance with the method 700.

With reference to the method 700 of FIG. 7A, in step 705, the size of the transistors in the source SRAM cell that uses conventional transistors is determined. In step 710, an intermediate SRAM cell is designed using EBE transistors. In one embodiment, the intermediate SRAM cell is a drop in replacement for the source SRAM cell and uses EBE transistors of substantially the same size (i.e. substantially the same width and length) as the source SRAM cell. Since the intermediate SRAM cell as a drop-in replacement preserves the width and length of the EBE NMOS pull-down transistor and the EBE NMOS pass-gate transistor, the NMOS active area of the intermediate SRAM cell can have a jog or notch resulting from differing widths for the NMOS pull-down transistor and the NMOS pass-gate transistor. Similarly, there can be a jog or notch in the gate layer for the EBE NMOS pull-down transistor and the EBE PMOS pull-up transistor resulting from differing lengths of these two transistors in the source SRAM cell. These jogs or notches in the NMOS active area and the gate layer are illustrated in the SRAM cell layout 750 (FIG. 7B).

Referring again to method 700 (FIG. 7A), in step 715, the length of the EBE NMOS pull-down transistor is resized to substantially the same length as the EBE PMOS pull-up transistor, where the resizing may include substantially eliminating the jog or notch in the gate layer. In step 720, the width of the NMOS active area is reduced thereby reducing the width of both the EBE NMOS pull-down and pass-gate transistors. This results in a reduction of the overall width of the SRAM cell. For example, if the width of the NMOS active area is reduced by 20 nm, then the width of the SRAM cell is reduced by 40 nm as a result of the reduced width of the two NMOS active areas in the SRAM cell. The extent of resizing in steps 715, and 720 can depend on the process used to fabricate the source SRAM cell and the target SRAM cell, and the layout of the source SRAM cell. In certain embodiments, the resizing performed in steps 715 and 720 can be approximately in the range of 2-30 nm. In step 725, the NMOS EBE transistor threshold voltage VTN and the PMOS EBE transistor threshold voltage VTP are selected. In one embodiment, VTN and VTP for the transistors in the SRAM cell are selected to substantially match the threshold voltages of the EBE NMOS and EBE PMOS transistors used in logic gates in the same integrated circuit. In an alternative embodiment, the threshold voltages VTN and VTP for the EBE transistors used in the SRAM cell are set to provide enhanced and preselected performance characteristics for the target SRAM cell, such as, read margin, write margin, and cell leakage current. In step 730, EBE transistor design parameters to obtain the VTN and VTP are determined. Such process parameters can include the thickness of the blanket epitaxial layer, the position of the screening region, the position of the threshold voltage tuning region, and/or the dopant concentration of the threshold voltage tuning region.

With reference to FIG. 7B, the layout 750 corresponds to the intermediate SRAM cell using EBE transistors resulting from step 710, in accordance with one embodiment. The annotations in FIG. 7B illustrate the resizing of the EBE transistors in the intermediate SRAM cell that are performed to obtain the target SRAM cell, in accordance with the third embodiment. In layout 750, the length of the EBE NMOS pull-down transistor is increased to substantially the same length as the EBE PMOS pull-up transistor by moving the edge 765 of the gate layer such that it is substantially aligned with the edge 770, as shown in FIG. 7B. In addition to these changes, the width of the NMOS active area is reduced by reducing the width of the diffusion region to reduce the overall width of the SRAM cell, as shown in FIG. 7B. As a result of these changes the gate layer between areas PPU and NPD (corresponding to the gates of the EBE PMOS pull-up and the EBE NMOS pull-down transistors, respectively) is substantially rectangular for the target SRAM cell, and the edges of this rectangular gate layer are substantially aligned with the edges of the PPU and NPD areas. It is noted that even though these changes are illustrated with respect to one of the NMOS active area and one of the gate layers in FIG. 7B, the corresponding changes can also be made to the other NMOS active area 775 and the gate layer 780 to obtain a target SRAM cell that has substantially no jogs or notches in the gate layer. In one embodiment, where the NMOS active area width is reduced by 10 nm, the target SRAM cell using EBE transistors has a width that is reduced by 20 nm.

Figure 8A:
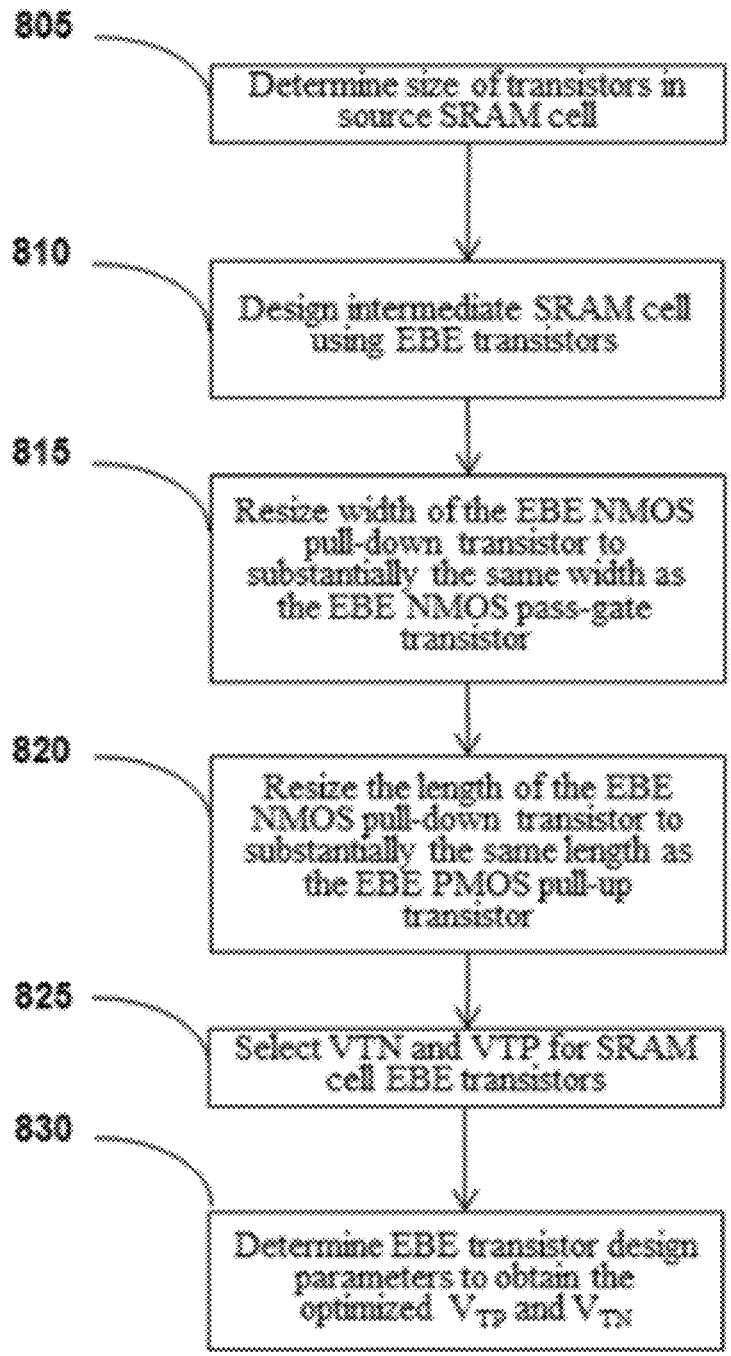
FIG. 8A is a flow diagram illustrating a method for porting a source SRAM cell using conventional transistors to a target SRAM cell using EBE transistors, in accordance with an embodiment.
Figure 8B:
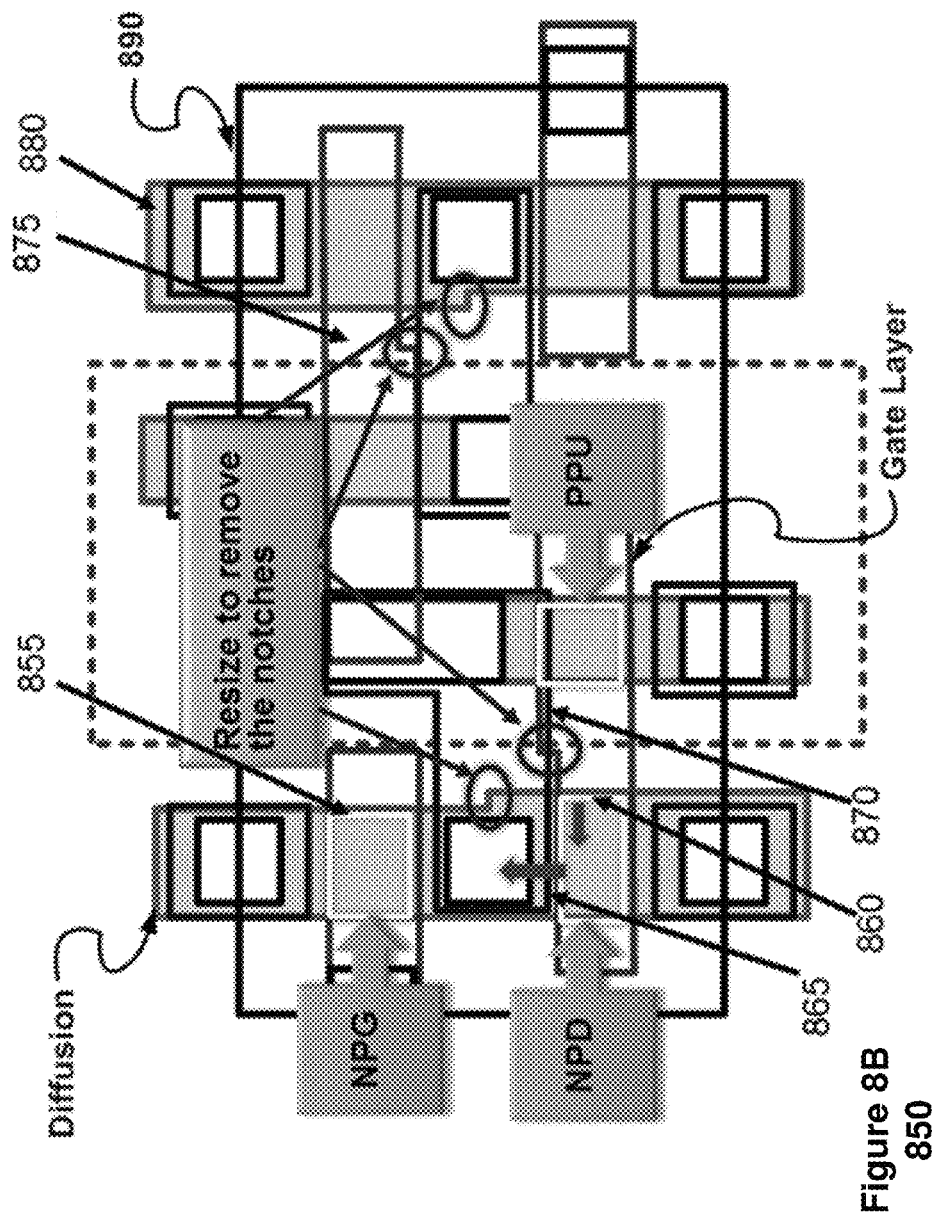
FIG. 8B is a layout of a 6T SRAM cell using EBE transistors illustrating the transistor size modifications that are performed to obtain the target SRAM cell, in accordance with the method 800.
Figure 8C:
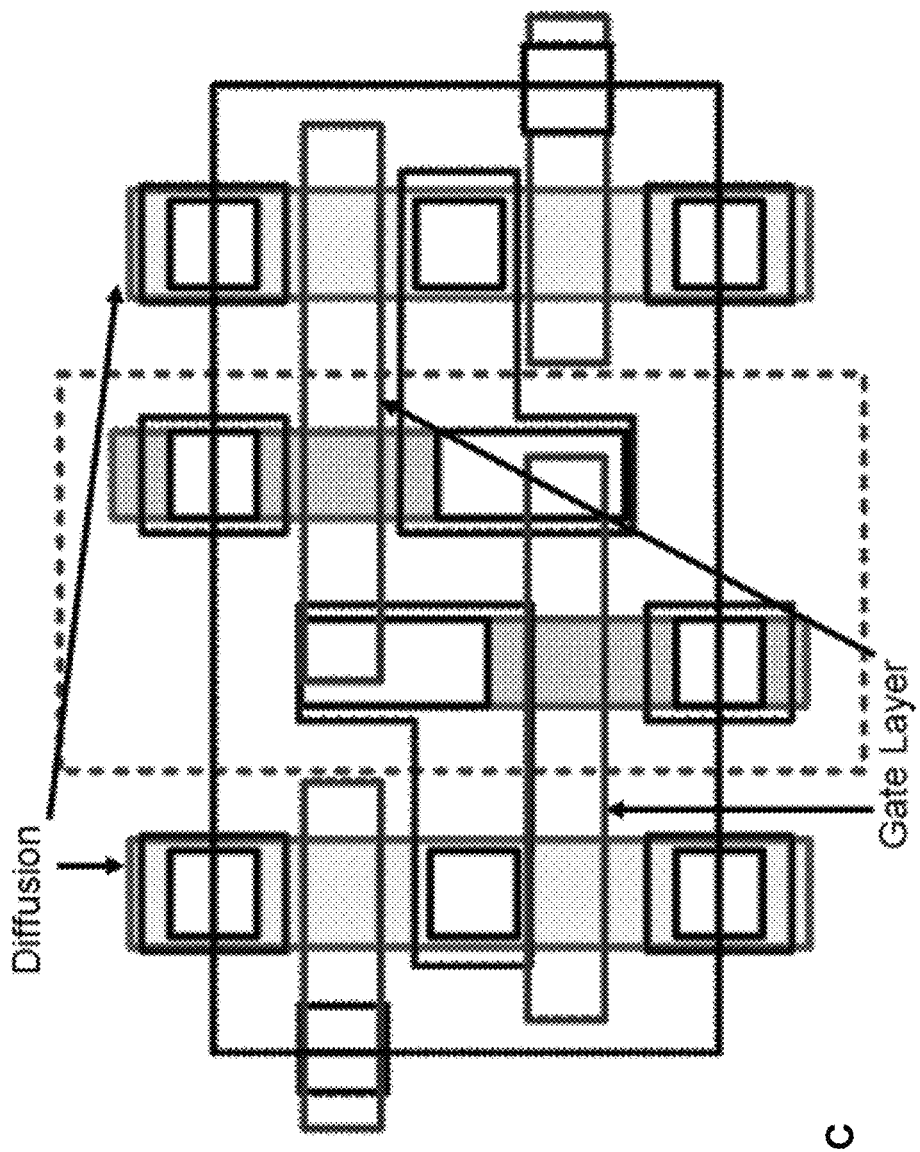
FIG. 8C illustrates the layout of the target SRAM cell after the resizing described above with reference to FIG. 8A and FIG. 8B, in accordance with one embodiment.

FIG. 8A is a flow diagram illustrating a method 800 for porting a source SRAM cell using conventional transistors to a target SRAM cell using EBE transistors, in accordance with a first embodiment. FIG. 8B is a layout 850 of a 6T SRAM cell using EBE transistors illustrating the transistor size modifications that are performed to obtain the target SRAM cell, in accordance with the method 800. FIG. 8C is a layout 890 of the target SRAM cell obtained as a result of method 800.

With reference to the method 800 of FIG. 8A, in step 805, the size of the transistors in the source SRAM cell that uses conventional transistors is determined. In step 810, an intermediate SRAM cell is designed using EBE transistors. In one embodiment, the intermediate SRAM cell is a drop in replacement for the source SRAM cell and uses EBE transistors of substantially the same size (i.e. substantially the same width and length) as the source SRAM cell. Since the intermediate SRAM cell as a drop in replacement preserves the width and length of the EBE NMOS pull-down transistor and the EBE NMOS pass-gate transistor, the NMOS active area of the intermediate SRAM cell can have a jog or a notch resulting from differing widths for the NMOS pull-down transistor and the NMOS pass-gate transistor. Similarly, there can be a jog or notch in the gate layer for the EBE NMOS pull-down transistor and the EBE PMOS pull-up transistor resulting from differing lengths of these two transistors in the source SRAM cell. These jogs or notches in the NMOS active area and the gate layer are illustrated in the SRAM cell layout 850 (FIG. 8B).

Referring again to method 800 (FIG. 8A), in step 815, the width of the EBE NMOS pull-down transistor is resized to substantially the same width as the EBE NMOS pass-gate transistor, where the resizing may substantially eliminate the jog or notch in the NMOS active area. In step 820, the length of the EBE NMOS pull-down transistor is resized to substantially the same length as the EBE PMOS pull-up transistor, where the resizing may substantially eliminate the jog in the gate layer. The extent of resizing in steps 815 and 820 can depend on the process used to fabricate the source SRAM cell and the target SRAM cell, and the layout of the source SRAM cell. In certain embodiments, the resizing performed in steps 815 and 820 can be approximately in the range of 2-30 nm. In step 825, the NMOS EBE transistor threshold voltage VTN and the PMOS EBE transistor threshold voltage are selected. In one embodiment, the threshold voltage of the EBE NMOS and EBE PMOS transistors in the SRAM cell are selected to have substantially the same value as the corresponding EBE NMOS and EBE PMOS transistors used in logic gates in the same integrated circuit. In an alternative embodiment, the threshold voltages VTN and VTP for the EBE transistors used in the SRAM cell are set to provide enhanced and preselected performance characteristics for the target SRAM cell, such as, read margin, write margin, and cell leakage current. In step 830, EBE transistor process parameters to result in the selected VTN and VTP are determined. Such process parameters can include the thickness of the blanket epitaxial layer, the position of the screening region, the position of the threshold voltage tuning region, and/or the dopant concentration of the threshold voltage tuning region.

With reference to FIG. 8B, the layout 850 corresponds to the intermediate SRAM cell using EBE transistors resulting from step 810, in accordance with one embodiment. The annotations in FIG. 8B illustrate the resizing of the EBE transistors in the intermediate SRAM cell that are performed to obtain the target SRAM cell, in accordance with the fourth embodiment. In layout 850, the width of the EBE NMOS pull-down transistor is reduced to substantially the same width as the EBE NMOS pass-gate transistor by moving the edge 860 of the diffusion region such that it is substantially aligned with the edge 855, as shown in FIG. 8B. In addition, the length of the EBE NMOS pull-down transistor is increased to substantially the same length as the EBE PMOS pull-up transistor by moving the edge 865 of the gate layer such that it is substantially aligned with the edge 870, as shown in FIG. 8B. As a result of these changes the diffusion region between the gate of the EBE NMOS pass-gate transistor (labeled NPG in FIG. 8B) and the gate of the EBE NMOS pull-down transistor (labeled NPD in FIG. 8B) is substantially rectangular for the target SRAM cell, and the edges of this rectangular region are substantially aligned with the edges of the NPG and NPD areas. In addition, the gate layer between area PPU and NPD (corresponding to the gates of the EBE PMOS pull-up and EBE NMOS pull-down transistors, respectively) is substantially rectangular for the target SRAM cell, and the edges of this rectangular gate layer are substantially aligned with the edges of the PPU and NPD areas. It is noted that even though these changes are illustrated with respect to one of the NMOS active areas and one of the gate layers in FIG. 8B, the corresponding changes can also be made to the other NMOS active area 875 and the gate layer 880 to obtain a target SRAM cell that has substantially no jogs or notches in the NMOS active area and the gate layer.

FIG. 8C illustrates the layout 890 of the target SRAM cell after the resizing described above with reference to FIG. 8A and FIG. 8B, in accordance with one embodiment.

Table I lists the enhanced performance characteristics of the four target SRAM cell embodiments using EBE transistors described above as compared to a source SRAM cell using conventional transistors. Table I provides the performance characteristics for six types of SRAM cells—(1) a SRAM cell using conventional transistors; (2) an intermediate SRAM cell obtained as a result of replacing each conventional transistor with an EBE transistor of substantially similar width and length; (3) a SRAM cell in accordance with the first embodiment discussed with reference to FIGS. 5A-C above; (4) a SRAM cell in accordance with the second embodiment discussed with reference to FIGS. 6A, 6B above; (5) a SRAM cell in accordance with the third embodiment discussed with reference to FIGS. 7A, 7B above; and (6) a SRAM cell in accordance with the fourth embodiment discussed with reference to FIGS. 8A-C above. The SRAM performance characteristics listed in Table I were obtained from Monte Carlo simulations performed with 1000 trials at a power supply voltage or 1.2 V, and at a temperature of 25° C. The values of VTN and VTP were 0.608 V and −0.761 V, respectively, for the SRAM cell using conventional transistors. The values of VTN and VTP were 0.488 V and −0.481 V, respectively, for the intermediate SRAM cell, and the four SRAM cell embodiments using EBE transistors. Each cell of Table I has three numbers with the first number corresponding to −5σ, the second number corresponding to the mean, and the third number corresponding to +5σ, respectively.

TABLE I

| SRAM Cell Type | Read Current (µA) | Read Margin (mV) | Write Margin (mV) | $V_{ddmin}$ (V) | Cell Leakage (pA) | Cell Area (µm²) |
|---|---|---|---|---|---|---|
| Source (conventional transistors) | 20.47 | 25 | 269 | 730 | 0 | No Change |
| | 31.70 | 183 | 494 | | 55.20 | |
| | 42.87 | 341 | 719 | | 226.2 | |
| Intermediate (EBE) | 33.97 | 105 | 460 | 410 | 0 | No Change |
| | 37.20 | 147 | 510 | | 101 | |
| | 40.45 | 189 | 560 | | 212 | |
| First Embodiment | 32.60 | 97.5 | 457 | 390 | 0 | No Change |
| | 35.70 | 141 | 507 | | 103 | |
| | 38.80 | 185 | 557 | | 218.5 | |
| Second Embodiment | 29.75 | 97 | 448 | 390 | 0 | ~2% reduction |
| | 32.70 | 142 | 503 | | 105 | |
| | 35.65 | 187 | 558 | | 229 | |
| Third Embodiment | 27.65 | 105 | 269 | 410 | 0 | ~4% reduction |
| | 30.50 | 150 | 494 | | 84.1 | |
| | 33.35 | 195 | 719 | | 182.1 | |
| Fourth Embodiment | 31.80 | 96 | 269 | 400 | 0 | No Change |
| | 34.80 | 139 | 494 | | 81.1 | |
| | 37.80 | 182 | 719 | | 168.6 | |

Table II illustrates the enhanced performance characteristics of the four target SRAM cell embodiments using EBE transistors after setting VTN and VTP, as described above. Note that the tradeoffs, for instance, for $V_{ddmin}$ and Cell Leakage depend on the specifications to support the application for the SRAM. Table II provides SRAM performance characteristics for the six types of SRAM cells listed in Table II after the determination of VTN and VTP. The SRAM performance characteristics listed in Table I were obtained from Monte Carlo simulations performed with 1000 trials at a power supply voltage or 1.2 V, and at a temperature of 25° C. The values of VTN are in the range of 0.538 V to 0.558 V, and the values of VTP are in the range of −0.381 V to −0.361 V for the intermediate SRAM cell, and the four SRAM cell embodiments using EBE transistors. The values of VTN and VTP were 0.608 V and −0.761 V, respectively, for the SRAM cell using conventional transistors.

TABLE II

| SRAM Cell Type | Read Current (µA) | Read Margin (mV) | Write Margin (mV) | $V_{ddmin}$ (V) | Cell Leakage (pA) | Cell Area (µm²) |
|---|---|---|---|---|---|---|
| Source (conventional transistors) | 20.47 | 25 | 269 | 730 | 0 | 0.5408 |
| | 31.70 | 183 | 494 | | 55.20 | |
| | 42.87 | 341 | 719 | | 226.2 | |
| Intermediate (EBE) | 28.30 | 174 | 357 | 570 | 0 | No Change |
| | 31.21 | 216 | 412 | | 50.1 | |
| | 34.14 | 258 | 467 | | 140.1 | |
| First Embodiment | 27.04 | 165 | 348 | 560 | 0 | No Change |
| | 29.98 | 208 | 402 | | 49.1 | |
| | 32.93 | 251 | 457 | | 133.1 | |
| Second Embodiment | 24.81 | 164 | 346 | 560 | 0 | ~2% reduction |
| | 27.51 | 208 | 401 | | 50.1 | |
| | 30.21 | 252 | 456 | | 140.1 | |
| Third Embodiment | 24.30 | 159 | 361 | 530 | 0 | ~4% reduction |
| | 27.00 | 203 | 416 | | 55.8 | |
| | 29.70 | 247 | 471 | | 145.3 | |
| Fourth Embodiment | 26.43 | 167 | 365 | 540 | 0 | No Change |
| | 29.18 | 208 | 415 | | 48 | |
| | 31.93 | 250 | 465 | | 136 | |

The SRAM cell embodiments and related methods described above can also be applied to hybrid target SRAM cells that use both EBE transistors and legacy transistors. For example, such hybrid target SRAM cell embodiments can use conventional PMOS pull-up transistors, and EBE NMOS pass-gate and pull-down transistors.

Together, the structures and methods of making the structures allow for EBE transistors having an enhanced body coefficient as compared to conventional nanoscale devices. With body bias voltage applied to the screening region, the EBE transistor can facilitate an even greater control over a wider range of device metrics, such as ON-current and OFF-current, compared to a conventional device. In addition, the EBE transistors have a better AVT, i.e., a lower $\sigma V_T$ than conventional devices. The lower $\sigma V_T$ enables a lower minimum operating voltage VDD and a wider range of available and reliable nominal values of $V_T$. As will be understood, wafers and die supporting multiple transistor types, including those with and without the described dopant layers and structures are contemplated. Electronic devices that include the disclosed transistor structures or are manufactured in accordance with the disclosed processes can incorporate die configured to operate as "systems on a chip" (SoC), advanced microprocessors, radio frequency, memory, and other die with one or more digital and analog transistor configurations, and are capable of supporting a wide range of applications, including wireless telephones, communication devices, "smart phones", embedded computers, portable computers, personal computers, servers, and other electronic devices. Electronic devices can optionally include both conventional transistors and transistors as disclosed, either on the same die or connected to other die via motherboard, electrical or optical interconnect, stacking or through used of 3D wafer bonding or packaging. According to the methods and processes discussed herein, a system having a variety of combinations of analog and/or digital transistor devices, channel lengths, and strain or other structures can be produced.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computer-implemented method for designing an integrated circuit, comprising:
    obtaining design layout data for a base integrated circuit with at least one SRAM cell to be converted to utilize enhanced body effect (EBE) transistors comprising a substantially undoped channel layer and a highly doped screening region beneath the channel layer; and
    performing, via a processor, the steps of:
    dividing NMOS active area patterns in the design layout into at least one enhanced body effect (EBE) NMOS active area layout with the NMOS active area patterns for the at least one SRAM cell and at least one non-EBE NMOS active layout with other ones of the NMOS active area patterns;
    dividing PMOS active area patterns in the design layout into at least one EBE PMOS active area layout with the PMOS active area patterns for the at least one SRAM cell and at least one non-EBE PMOS active layout with other ones of the PMOS active area patterns;
    adjusting a size of the NMOS active area patterns in the EBE NMOS active area layout to reduce a width of at least pull-down devices in the at least one SRAM cell; and
    altering a gate layer layout in the design layout data such that a length of pull-up devices in the at least one SRAM and a length of the pull-down devices are substantially equal.

2. The method of claim 1, further comprising:
    after the altering and adjusting, selecting process parameters such that electrical parameters for transistors in the at least one SRAM cell meet a criteria, the selection of the process parameters based at least on the EBE NMOS active area layout, the EBE PMOS active area layout, and the gate layer layout.

3. The method of claim 1, wherein the step of adjusting comprises resizing a portion of the EBE NMOS active area layout associated with the pull-down devices so that a width of the pull-down devices and a width of pass-gate devices in the at least one SRAM cell are substantially equal, wherein the step of altering comprises resizing the gate layer layout for the pull-up devices.

4. The method of claim 1, wherein the step of adjusting comprises resizing a portion of the EBE NMOS active area layout associated with the pull-down devices so that a width of the pull-down devices and a width of pass-gate devices in the at least one SRAM cell are substantially equal, wherein the step of altering comprises resizing the gate layer layout for the pull-up devices, and wherein the step of adjusting further comprises reducing a width of the EBE NMOS active areas so that at least one overall dimension of the at least one SRAM cell is reduced.

5. The method of claim 1, wherein the step of altering comprises resizing the gate layer layout for the pull-down devices, and wherein the step of adjust comprises reducing widths of the pull-down devices and pass-gate devices in the at least one SRAM cell so that one overall dimension of the at least one SRAM cell is reduced.

6. The method of claim 1, wherein the step of adjusting comprises resizing a portion of the EBE NMOS active area layout associated with the pull-down devices so that a width of the pull-down devices and a width of pass-gate devices in the at least one SRAM cell are substantially equal, wherein the step of altering comprises resizing the gate layer layout for the pull-down devices.

* * * * *